United States Patent
Philippe et al.

(10) Patent No.: US 11,290,709 B2
(45) Date of Patent: Mar. 29, 2022

(54) IMAGE DATA ENCODING AND DECODING

(71) Applicant: SONY CORPORATION, Tokyo (JP)

(72) Inventors: Magali Kimlee Miri Philippe, Basingstoke (GB); Karl James Sharman, East Ilsley (GB); Stephen Mark Keating, Reading (GB)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 16/626,183

(22) PCT Filed: Jul. 5, 2018

(86) PCT No.: PCT/GB2018/051895
§ 371 (c)(1),
(2) Date: Dec. 23, 2019

(87) PCT Pub. No.: WO2019/008366
PCT Pub. Date: Jan. 10, 2019

(65) Prior Publication Data
US 2020/0221075 A1    Jul. 9, 2020

(30) Foreign Application Priority Data
Jul. 5, 2017    (GB) ..................... 1710825

(51) Int. Cl.
*H04N 19/103*    (2014.01)
*H04N 19/14*    (2014.01)
(Continued)

(52) U.S. Cl.
CPC ........... *H04N 19/103* (2014.11); *H04N 19/14* (2014.11); *H04N 19/18* (2014.11); *H04N 19/593* (2014.11); *H04N 19/82* (2014.11); *H04N 19/176* (2014.11)

(58) Field of Classification Search
CPC ...... H04N 19/103; H04N 19/14; H04N 19/18; H04N 19/593; H04N 19/82; H04N 19/176
(Continued)

(56) References Cited

U.S. PATENT DOCUMENTS 5,822,004 A    10/1998  Crocitti et al.
2009/0154820 A1*    6/2009  Li .................... H04N 19/91
                                              382/246
(Continued)

FOREIGN PATENT DOCUMENTS

EP    1 193 979 A2    4/2002

OTHER PUBLICATIONS

Zhao, Z. et al, "A highly efficient parallel algorithm for H. 264 video encoder," Acoustics, Speech and Signal Processing, 2006, IEEE International Conference on Toulouse, France, May 14, 2004, XP031387155, total pp. 4.
(Continued)

*Primary Examiner* — Jae N Noh
(74) *Attorney, Agent, or Firm* — Oblon, McClelland, Maier & Neustadt, L.L.P.

(57) ABSTRACT

Apparatus comprises an image data encoder to encode a current image region of an image, the image data encoder being operable in at least two modes of operation; a controller to control a mode of operation of the image data encoder in dependence upon the encoded data for the current image region meeting a predetermined criterion; and prediction circuitry configured to predict, from one or more properties of one or more image regions other than the current image region, whether the encoded data for the current image region will meet the predetermined criterion.

18 Claims, 17 Drawing Sheets

(51) Int. Cl.
*H04N 19/18* (2014.01)
*H04N 19/593* (2014.01)
*H04N 19/82* (2014.01)
*H04N 19/176* (2014.01)

(58) Field of Classification Search
USPC .................................................. 375/240.14
See application file for complete search history.

(56) References Cited

U.S. PATENT DOCUMENTS

| | | | | |
|---|---|---|---|---|
| 2010/0128995 | A1* | 5/2010 | Drugeon | H04N 19/51 382/238 |
| 2012/0020408 | A1* | 1/2012 | Chen | H04N 19/134 375/240.03 |
| 2014/0270718 | A1 | 9/2014 | Joset et al. | |
| 2016/0381383 | A1* | 12/2016 | Oh | H04N 19/107 375/240.16 |
| 2019/0174131 | A1* | 6/2019 | Abe | H04N 19/13 |
| 2020/0021804 | A1* | 1/2020 | Jun | H04N 19/159 |

OTHER PUBLICATIONS

Drugeon, V et al "High precision edge prediction for intra coding," 15$^{th}$ IEEE International Conference on Image Processing, Oct. 12, 2008, XP002501811, pp. 1620-1623.

Chen, J. et al "Algorithm Description of Joint Exploration Test Model 6 (JEM6)," Joint Video Exploration Team (JVET) of ITU-T SG 16 WP 3 and ISO/IEC JTC 1/SC 29/WG 11, May 31, 2017, XP030150793, total pp. 49.

Filippov, a. et al "Reference sample adaptive filtering for intra coding," Huawei Technology Ltd. Co., Oct. 29, 2015, XP030065893, pp. 1-4.

International Search Report dated Dec. 20, 2018 in PCT/GB2018/051895 filed on Jul. 5, 2018.

* cited by examiner

FIG. 27

```
const int g_pdpc_pred_param[5][35][6] = (5 sizes, 35 intraModes(intraMode divided by 2), 6 parameters)
{
2700  {{ 33,  7, 33,  7, 30,  3}, { 25,  5, 25,  5,  0,  0}, { 10,  8, 29, 4,11,  1}, { 17,  5, 20,  5, 52,  1}, { 17,  5, 20,  5, 52,  1}, { 21,18,
       7, 70,  2}, { 21,  3, 18,  7, 70,  2}, { 20,  1,18, 11, 63,  2}, { 10,  8, 29, 4,11,  1}, { 16,  1, 30, 24, 56,  1}, { 16,  1, 30, 24, 56,  1}, { 15, 14, 67,  3},
       { 15,  0, 15, 14, 67,  3}, { 15,  2,  9,  2, 62,  1}, { 15,  2,  9,  2, 62,  1}, { 16,  1, 30, 24, 56,  1}, {  4,  3,  4,  3, 22,  1}, { 10,  2, 11,  4,
       40,  1}, { 10,  2, 11,  4, 40,  1}, {  9,  2, 15,  2, 62,  1}, { 11,  4, 10, 240,  1}, { 15, 14, 15,  0, 67,  3}, { 30, 24, 16,  1, 56,  1}, { 30,
       24, 16,  1, 56,  1}, { 18, 11, 20,  1, 63,  2}, {  2,  5,  2, 62,  1}, { 15, 14, 15,  0, 67,  3}, { 18,  7, 21,  3, 70,  2}, { 20,  5, 17,  5, 52,
       1}, { 29,  4, 10,  8, 11,  1}, { 29,  4, 10,  8,11,  1}, { 18,  7, 21,  3, 70,  2}, { 18,  7, 21,  3, 70,  2}, { 20,  5, 17, 5, 52,  1}}, 2710  {{ 36,  7, 36,  7, 26,  3}, { 33,  8, 33,  8,  0,  0}, { 22,  7, 32,  6, 24,  3}, { 22,  7, 32,  6, 24,  3}, { 35,  4, 29,  8, 45,  2}, { 35, 4, 29,  8, 45,  2}, { 41,  3, 27,
       12, 65,  3}, { 41,  3, 27, 12, 65,  3}, { 54,  1, 26, 16, 63,  2}, { 26, 16, 63,  2}, { 54,  1, 34, 25, 52,  1}, { 35,  4, 25, 52,  1}, { 54, -1, 34, 25, 52,  1}, { 24, -1, 21, 20, 62,  1
       }, { 24, -1, 21, 20, 62,  1}, { 21,  3, 19,  3, 35,  1}, { 19,  4,  2,  3, 36,  2}, { 19,  4, 21,  3, 36,  2}, { 15, 6, 15,  6, 23,  2}, { 21,  3, 19,  2
       }, { 21,  3, 19,  4, 36,  2}, { 19,  3, 21,  3, 35,  1}, { 19,  3, 21,  3, 35,  1}, { 21, 20, 24, -1, 62,  1}, { 21, 20, 24, -1, 62,  1}, { 34, 25, 54, -1, 52,  1}, {
       34, 25, 54, -1, 52,  1}, { 26, 16, 54,  1, 63,  2}, { 26, 16, 54,  1, 63,  2}, { 27, 12, 41,  3, 65,  3}, { 27, 12, 41,  3, 65,  3}, { 29,  8,35,  4, 45,  2}, { 29,  8, 35,
       4, 45,  2}, { 32,  6, 22,  7, 24,  3}, { 32,  6, 22,  7, 24,  3}}, 2720  {{ 45,  5, 45,  5, -5,  3}, { 36,  8, 36,  8,  0,  0}, { 30,  6, 46,  6,-15,  3}, { 30,  6, 46, 6,-15,  3}, { 31,  5, 39,  8, 15,  3}, { 31, 5, 39,  8, 15,  3}, { 35,  3, 35,
       11, 42,  3}, { 35, 11, 42,  3}, { 45,  1, 35, 19, 46,  3}, { 45,  1, 35, 19, 46,  3}, { 32,  0, 40, 32, 47,  3}, { 32,  0, 40, 32, 47,  3}, { 38,  0, 23, 13, 38,  2
       }, { 38,  0, 23, 13, 38,  2}, { 26,  2, 24, 0, 28,  3}, { 26,  2, 24, 0, 28,  3}, { 25,  2, 23,  0, 19,  3}, { 25,  2, 23,  0, 19,  3}, { 29, 1, 29,  1, -7,  3}, { 24,  0, 25,
       2, 19,  3}, { 24,  0, 25,  2, 19,  3}, { 23, 13, 38,  0, 38,  2}, { 23, 13, 38,  0, 38,  2}, { 40, 32, 32,  0, 47,  3}, { 40, 32, 32,  0, 47,  3}, { 35, 11, 35, 3, 42,  3}, { 35, 11, 35,  3, 42,  3}, { 39,  8, 31,
       5, 15,  3}, { 35, 19, 45,  1, 46,  3}, { 35, 19, 45,  1, 46,  3}, { 46,  6, 30,  6,-15,  3}, { 46, 6, 30,  6,-15,  3}, { 39,  8, 31, 5, 15,  3}, { 39,  8, 31,
       5, 15,  3}}, 2730  {{ 46,  6, 46,  6, -3,  5}, { 44,  4, 44,  4,  0,  0}, { 33,  3, 52,  4,-18,  5}, { 33,  3, 52, 4,-18,  5}, { 38,  3, 50,  5, -5,  5}, { 38,  3, 50, 5, -5,  5}, { 40,  2, 47,  9,
       16,  5}, { 40,  2, 47,  9, 16,  5}, { 48,  1, 45, 17, 22,  5}, { 48,  1, 45, 17, 22,  5}, { 45, -1, 46, 30, 36,  5}, { 45, -1, 46, 30, 36,  5}, { 41, -1, 37, -1, 14,  5}, {
       41,  1, 37, -1, 14,  5}, { 35,  1, 39, -2,  3,  5}, { 35,  1, 39, -2,  3,  5}, { 41, -1, 43, -1, -7,  5}, { 41, -1, 43, -1, -7,  5}, { 32,  0, 32,  0, -6,  5}, { 43, -1, 41, -1, -
       7,  5}, { 43, -1, 41, -1, -7,  5}, { 39, -2, 35,  1,  3,  5}, { 39, -2, 35,  1,  3,  5}, { 37, -1, 41,  1, 14,  5}, { 37,-1, 41,  1, 14,  5}, { 46, 30, 45, -1, 36,  5}, {
       30, 45, -1, 36,  5}, { 45, 17, 48,  1, 22,  5}, { 45, 17, 48,  1, 22,  5}, { 47,  9, 40,  2, 16,  5}, { 47,  9, 40,  2, 16,  5}, { 50,  5, 38, 3, -5,  5}, { 50,  5, 38, 3, -5,
       5}, { 52,  4, 33,  3,-18,  5}, { 52,  4, 33,  3,-18,  5}}, 2740  {{ 42,  5, 42,  5, -5,  7}, { 40,  3, 40,  3,  0,  0}, { 28,  2, 49,  3,-22,  7}, { 28,  2, 49, 3,-22,  7}, { 27,  2, 48,  3,-16,  7}, { 27,  2, 48, 3,-16,  7}, { 27,  1, 44,
       5,  8,  7}, { 27,  1, 44,  5,  8,  7}, { 41,  2, 39, 12, 16,  7}, { 41,  2, 39, 12, 16,  7}, { 42,  0, 38, 21, 24,  7}, { 42,  0, 38, 21, 24,  7}, { 38,  0, 34, -4,  5,  7}, {
       38,  0, 34, -4,  5,  7}, { 37,  1, 43, -1, -5,  7}, { 37,  1, 43, -1, -5,  7}, { 25,  0, 42, -1,-13,  7}, { 25,  0, 42, -1,-13,  7}, { 25,  0, 42, -1,-13,  7}, { 42, -1, 25,  0, -
       13,  7}, { 42, -1, 25,  0,-13,  7}, { 43, -1, -5,  7}, {  3, -1,  8,  7}, { 43, -1, 37,  1, -5,  7}, { 34, -4, 38, 0,  5,  7}, { 34, -4, 38,  0,  5,  7}, { 38, 21, 42, 0, 24,  7}, { 42, -1, 25,  0,-
       13,  7}, { 42,  0, 24,  7}, { 39, 12, 41,  2, 16,  7}, { 39, 12, 41,  2, 16,  7}, { 44,  5, 27,  1,  8,  7}, { 44,  5, 27,  1,  8, 7}, { 48,  3, 27, 2,-16,  7}, { 48,  3, 27, 2,-16,
       7}, { 49,  3, 28,  2,-22,  7}, { 49,  3, 28,  2,-22,  7}}
}
```

IMAGE DATA ENCODING AND DECODING

BACKGROUND OF THE INVENTION

Field of the Invention

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Current video codecs (coder-decoders) such as those used in H.264/MPEG-4 Advanced Video Coding (AVC) achieve data compression primarily by only encoding the differences between successive video frames. These codecs use a regular array of so-called macroblocks, each of which is used as a region of comparison with a corresponding macroblock in a previous video frame, and the image region within the macroblock is then encoded according to the degree of motion found between the corresponding current and previous macroblocks in the video sequence, or between neighbouring macroblocks within a single frame of the video sequence.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

SUMMARY OF THE INVENTION

The present disclosure addresses or mitigates problems arising from this processing. Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 27 schematically illustrates a set of filter parameters;

DESCRIPTION OF THE PREFERRED EMBODIMENTS

Figure 1:
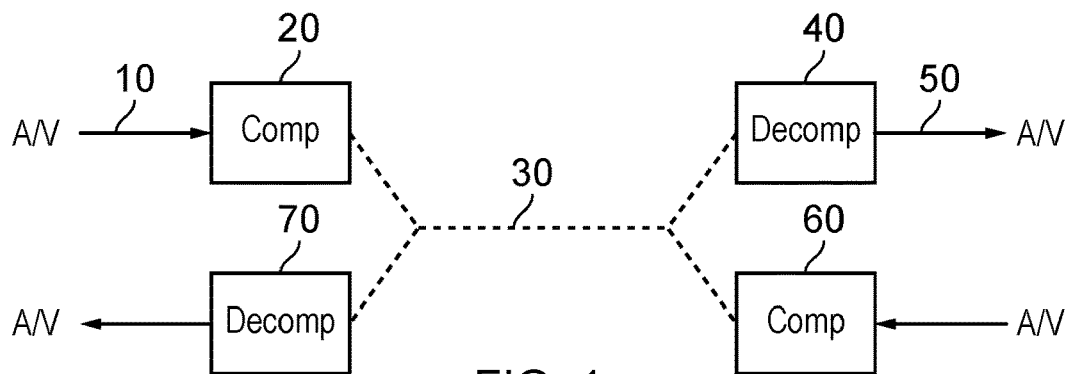
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology. Obviously, numerous modifications and variations of the present disclosure are possible in light of the above teachings. It is therefore to be understood that within the scope of the appended claims, the invention may be practiced otherwise than as specifically described herein.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
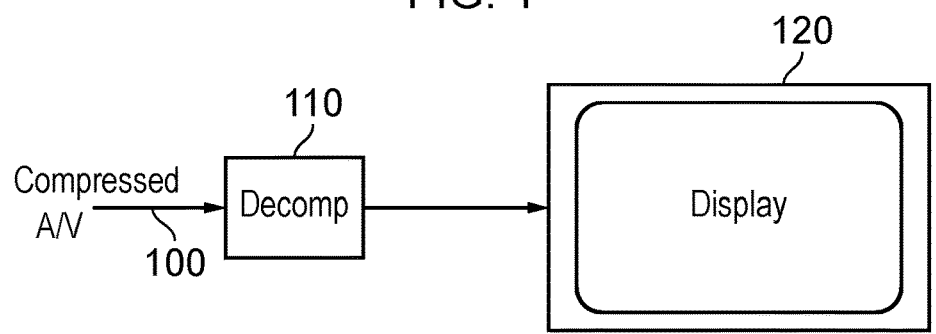
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
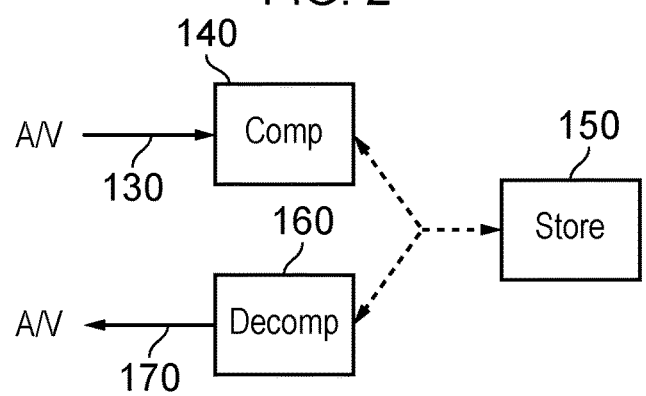
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
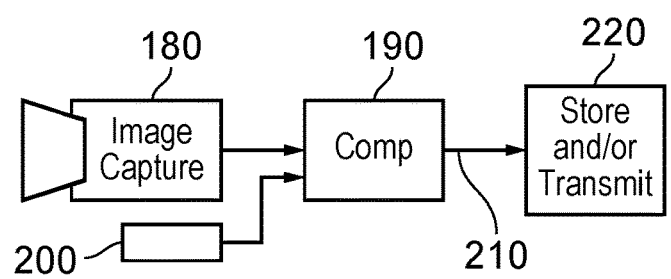
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

Figure 5:
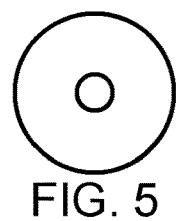
FIGS. 5 and 6 schematically illustrate storage media.
Figure 6:
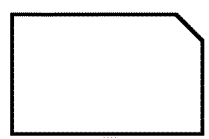

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
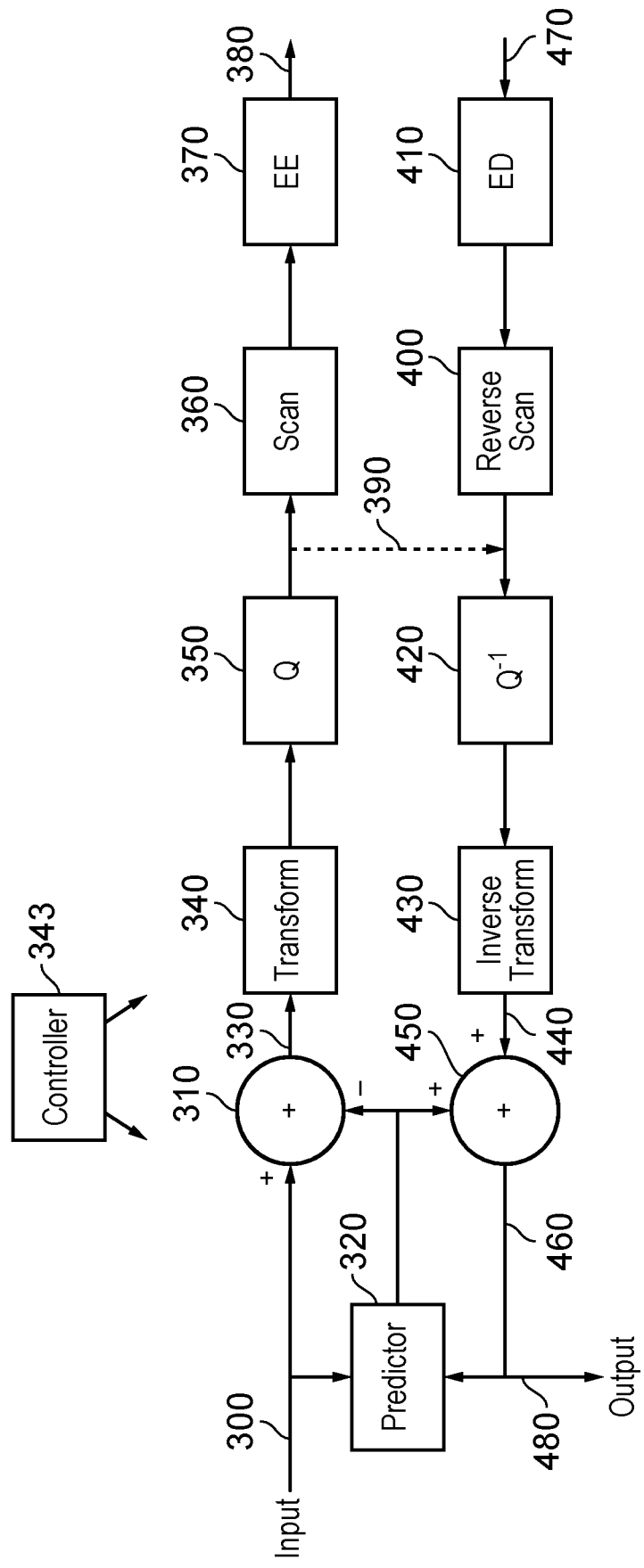
FIG. 7 provides a schematic overview of a video data compression and decompression apparatus.

FIG. 7 provides a schematic overview of a video data compression and decompression apparatus.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
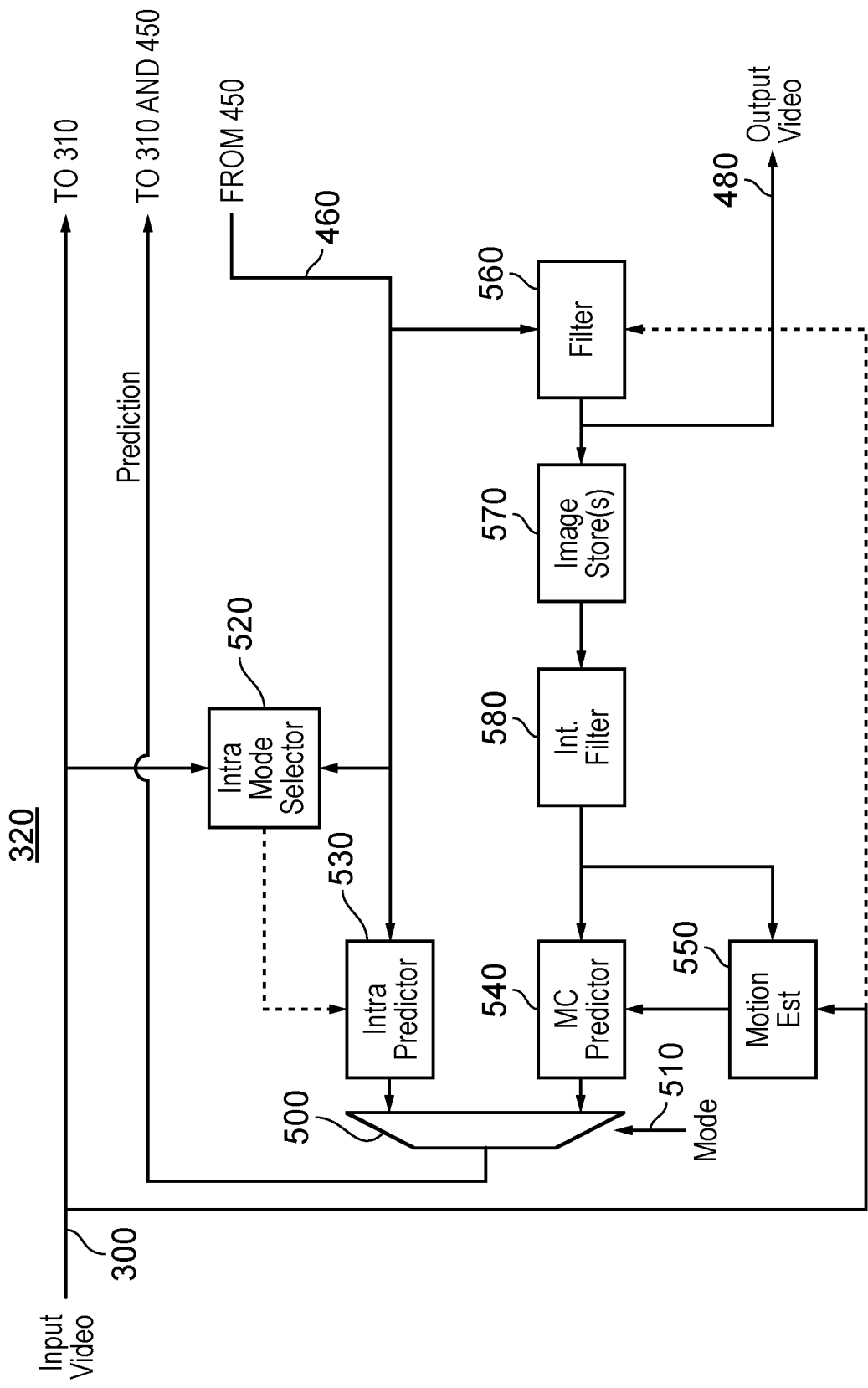
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output data-stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in Bross et al: "High Efficiency Video Coding (HEVC) text specification draft 6", JCTVC-H1003_d0 (November 2011), the contents of which are incorporated herein by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
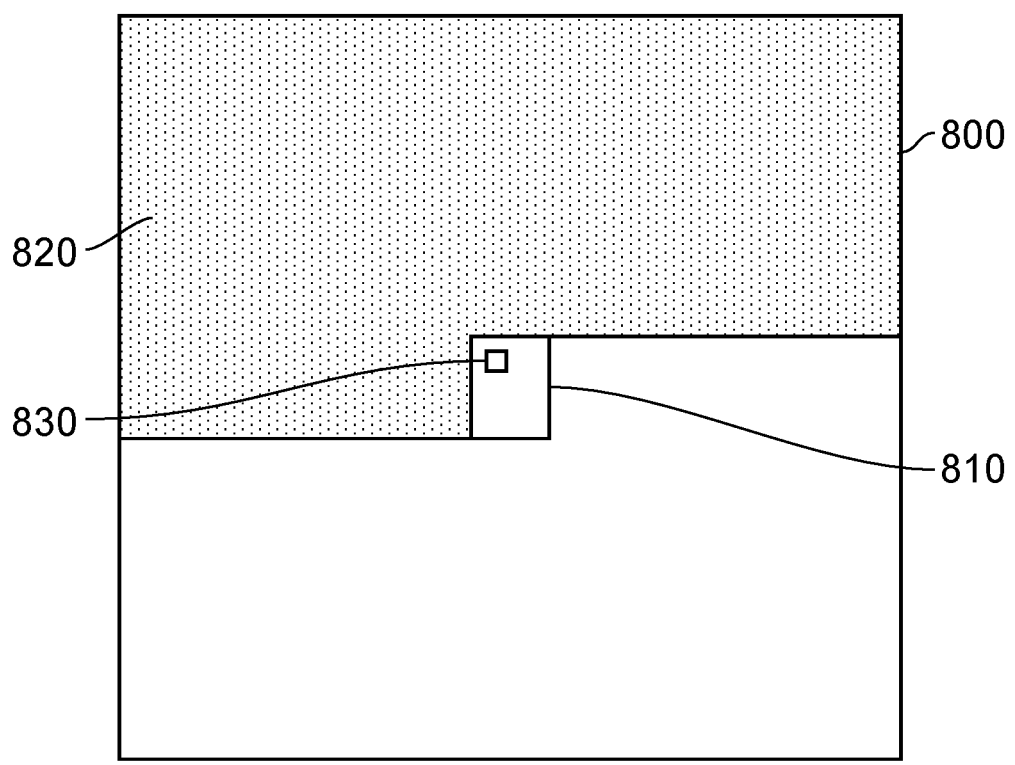
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples such as HEVC the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of eth same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 10:
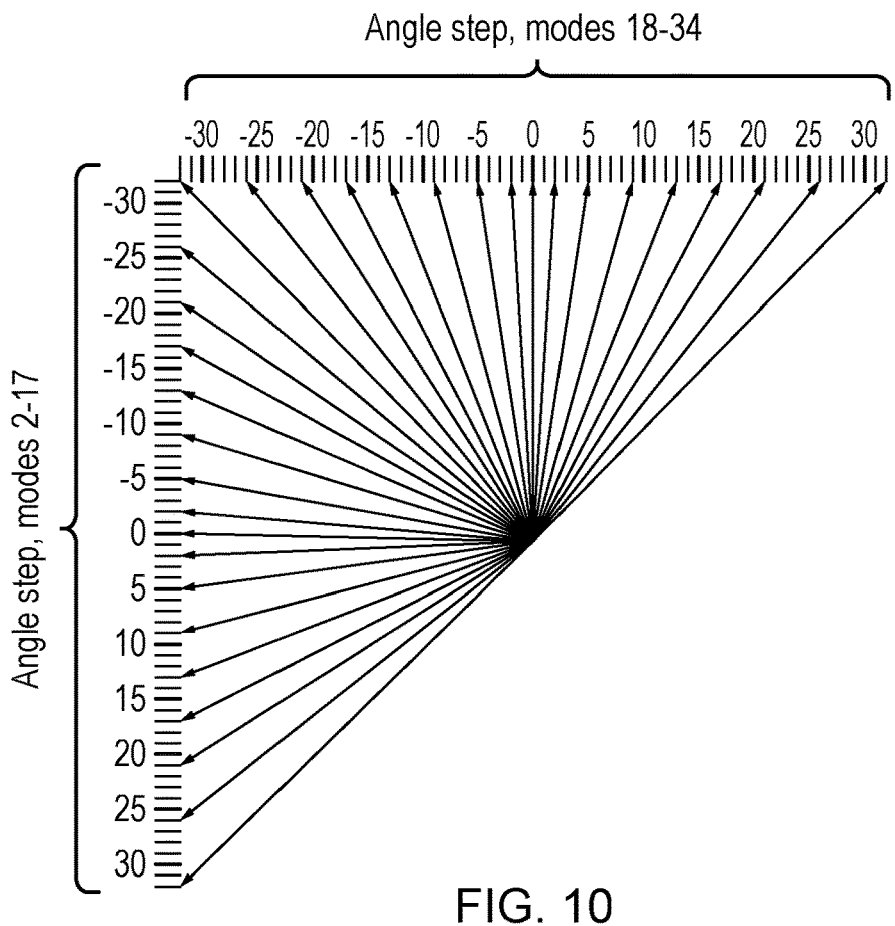
FIG. 10 schematically illustrates a set of possible intra-prediction directions.
Figure 11:
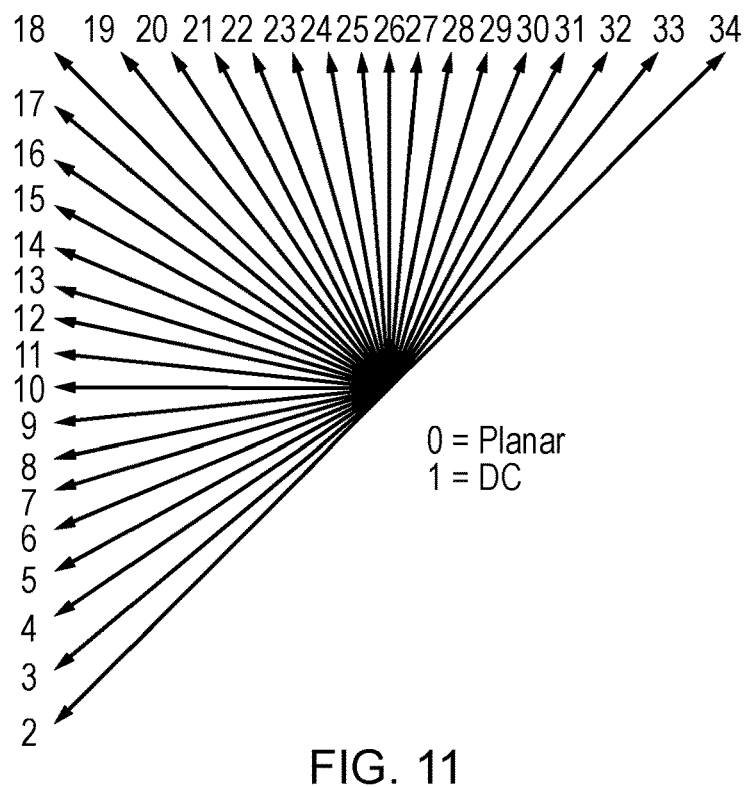
FIG. 11 schematically illustrates a set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) as shown schematically in FIG. 12 makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image.

Figure 13:
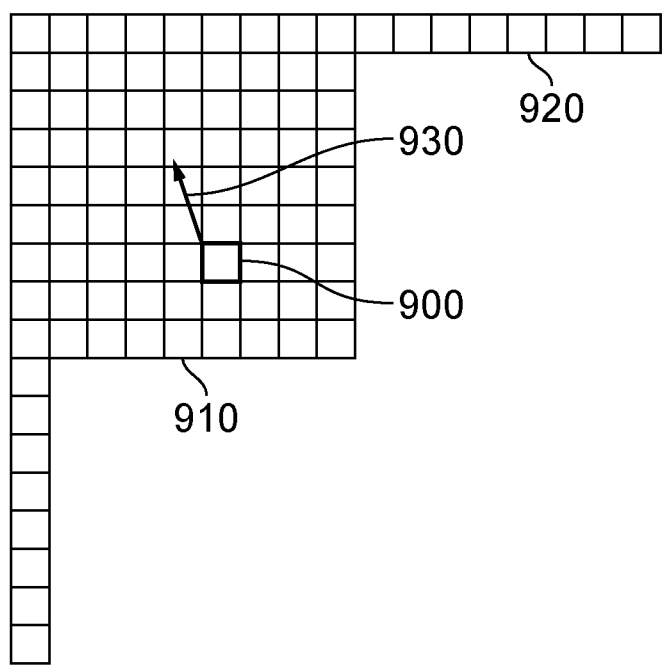
FIG. 13 schematically illustrates an intra-prediction process.

FIG. 13 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 13 or could be another shape such as rectangular.

Figure 14:
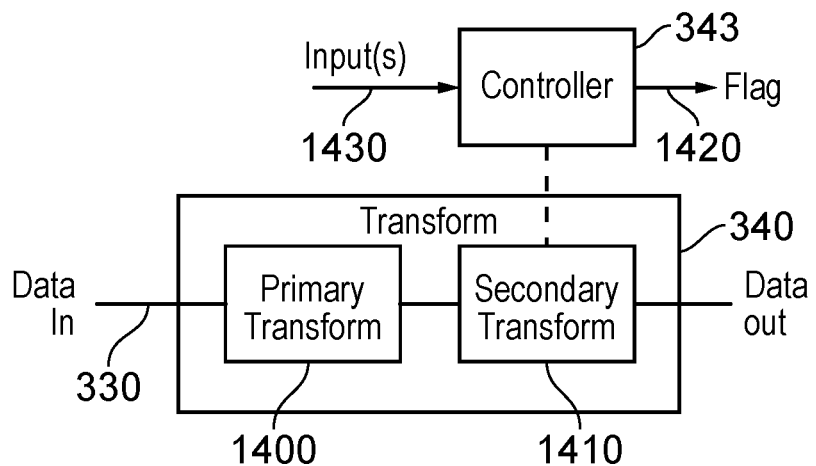
FIG. 14 schematically illustrates a data transform unit.
Figure 15:
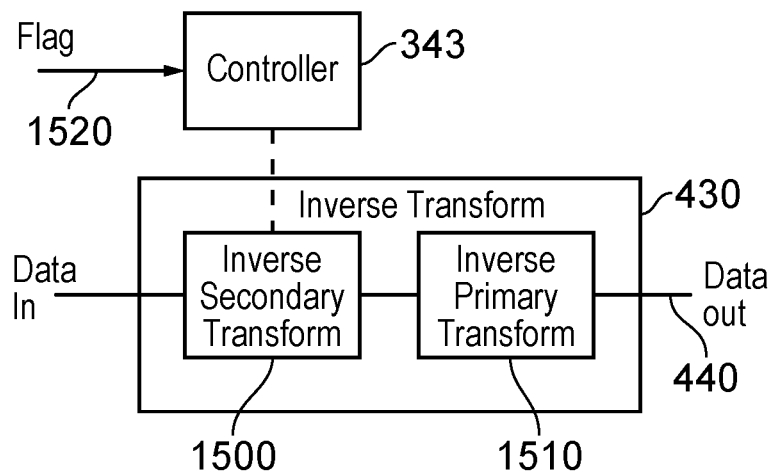
FIG. 15 schematically illustrates an inverse transform unit.

FIG. 14 provides an example showing more detail of the transform unit 340 of FIG. 7, and FIG. 15 provides an example showing more detail of the inverse transform unit 430 of FIG. 7. In each case, at least some operations of the transform unit 340 and the inverse transform unit 430 are under the control of the controller 343.

Referring to FIG. 14, the transform unit 340 comprises primary transform circuitry 1400 and secondary transform circuitry 1410, as an example of data transform circuitry configured to apply one or more data transforms to data representing the current image region, the one or more data transforms comprising: a primary transform (by the circuitry 1400), in a first mode of operation of the data transform circuitry; and a primary transform and a secondary transform (by the circuitries 1400, 1410), in a second mode of operation of the data transform circuitry. At the decoder side, the apparatus is configured to detect from data input to the apparatus whether the data transform circuitry is to operate in the first or the second mode of operation.

In some examples, a video compression system can use a single (primary) transform which acts on residual data 330 to convert it into frequency domain coefficients. However, in other circumstances, it has been found that applying a secondary transform to the output data from the primary transform can provide an improved efficiency, which is to say can decrease "energy" (discussed above) of the transformed data, which in turn can lead to a more efficient operation of the quantisation and entropy encoding stages. The secondary transform may have the effect of causing the set of non-zero coefficients (in the secondary-transformed data) to be closer (in spatial frequency represented by the coefficient) to DC than in the primary-transformed coefficients. This can mean that there are fewer non-zero coefficients to be encoded (which is to say fewer non-zero coefficients) in the data output by the transform unit 340, meaning that less data is required to represent the residual block.

There are therefore at least two modes of operation of the transform unit 340:

(i) a mode in which (only) a primary transform is used, and (ii) a mode in which a primary and a secondary transform is used.

However, further example modes can be used; as with the two modes discussed above, these are selectable under the control of the controller 343 and can be signalled explicitly or implicitly to the decoder circuitry (where implicit signalling in this context could involve "hiding" a signalling indication in other data, for example by adjusting parity values, or could involve the transform mode being signalled by a certain combination of other (explicitly signalled) parameters). For example, these other (or additional) modes may include one or more of:

(iii) a transform-skip mode, in which neither a primary nor a secondary transform is used;

(iv) a so-called Explicit Multiple Transform (EMT) in which one or more transforms, which may include different forms of DCT, sinusoidal transforms (such as the DST), Hadamard transforms or the like are used. A transform can be selected from a subset applicable to the prediction mode, and the selection can be signalled to the decoder;

(v) a so-called Adaptive Multiple Transform (AMT) mode in which multiple transforms can be selected and signalled (or implied at the decoder from other data).

Permutations of these different modes of operation can be considered as sets of modes of operation of the transform unit 340.

At the decoder site, or in the decoder path of an encoder, a corresponding inverse secondary transform can be performed by circuitry 1500 (if a secondary transform is indicated to have taken place at the encoder side) before inverse primary transform circuitry 1510 provided the inverse of the primary transform. This is just an example relating to the inverse operation applicable to the modes (i) and (ii) discussed above. In the case of a transform unit 340 operating in accordance with a set of operational modes representing a permutation of any two or more of the modes (i)-(v) discussed above, corresponding inverse transform arrangements, selectable by the controller 343 in response to explicit or implicit signalling, are provided at the decoder side.

Examples of secondary transform techniques are disclosed by WO2017/058614 A1. The contents of this reference are incorporated herein by reference.

The controller 343 controls the secondary transform operation (amongst other aspects controlled by the controller, not shown in FIGS. 14 and 15). In particular, the controller 343 (a) determines whether or not a secondary transform should be applied; (b) generates a flag or other indication 1420 to indicate to a decoder that a secondary transform has been applied; and optionally (c) determines the nature and/or parameters of a secondary transform. The controller does this on the basis of one or more inputs 1430 which may be, for example, data indicative of properties of the current region to be encoded, data indicative of properties of one or more previously-encoded regions, and/or data indicative of the results of a trial encoding or trial partial encoding of the current region.

The flag 1420 is sometimes referred to as an NSST (non-separable secondary transform) flag. At the decoder site, the controller 343 is responsive to the NSST flag 1520 to control the operation of the inverse secondary transform circuitry 1500, in particular whether the inverse secondary transform should be applied (or the circuitry 1500 should be bypassed) and optionally the nature of the inverse secondary which is applied by the circuitry 1500.

Note that the inverse primary and secondary transforms are still in fact "transforms" and may be referred to as such.

Figure 16:
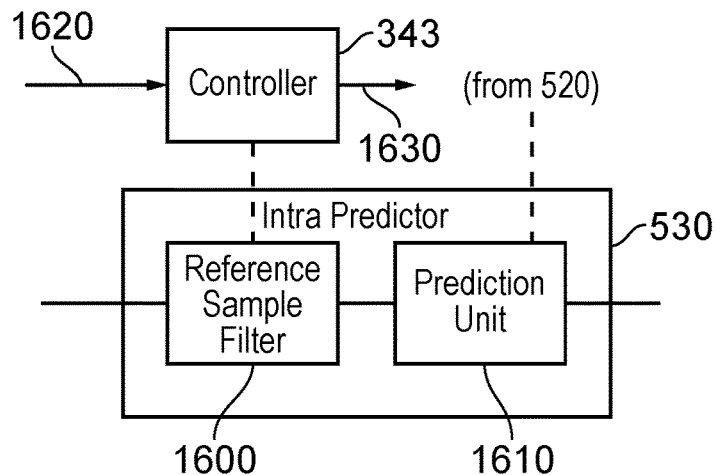
FIG. 16 schematically illustrates an intra predictor.

FIG. 16 provides a more detailed representation of the intra predictor 530 of FIG. 8. In particular, the intra predictor 530 comprises a reference sample filter 1600 and a prediction unit 1610 which acts to predict a current sample of a current region of an image with respect to one or more reference samples of the same image according to a prediction direction between the current sample and a reference position amongst the reference samples.

The reference sample filter applies a filtering operation to at least some of the reference samples corresponding to or applicable to the current predicted region. Here, the reference samples "corresponding to" or "applicable to" the current region are those which are for use, in an intra prediction process, for prediction of samples of the current region. These can include a "full set" of reference samples such as the samples 920 of FIG. 13, even though the actual use of the full set of reference samples, for a particular image region having a particular associated prediction mode or direction, may require only some of the full set of reference samples. For example, if the prediction mode is substantially "vertical", reference samples to the left of the current region may not be used in that particular instance, but can still be considered part of the full set of reference samples. Note that techniques have been proposed to repeat or extrapolate reference samples to reference sample positions in the full set which are not available, because samples at those positions have not yet been decoded.

Alternatively the reference samples applicable to a current region could encompass those reference samples which, according to the particular prediction mode in use for that current region, are used in prediction of samples at sample positions in the current region.

The reference sample filter operates under the control of the controller 343. As before, other operations of the controller 343 (such as controlling the operation of the prediction unit 1610) are not shown in FIG. 16. The controller 343 controls aspects of the operation of the reference sample filter such as: the type of filtering to be used in respect of reference samples corresponding to a particular predicted region; and filter coefficient data defining the operation of the selected type of filter. In some examples, the controller 343 can control the reference sample filter 1600 not to act on the current set of reference samples (either by bypassing the reference sample filter 1600 or by controlling the reference sample filter 1600 to apply a "dummy" filtering operation which makes no difference to the reference samples for the current predicted region).

The prediction unit operates under the control of the intra mode selector 520 as discussed above.

The prediction unit 1610 as described provides an example of an intra-image predictor configured to predict a current sample of a current image region, of a plurality of regions of an image, with respect to one or more corresponding reference samples of the same image according to a prediction direction between the current sample and a reference position amongst the reference samples. The filter 1600 provides an example of a reference sample filter to selectively apply the selected filter to at least some of the reference samples corresponding to the current region. The controller 343 acts, in this context, as a selector configured to select a filter, of a set of two or more filters each defined by the same filtering operation and a respective different set of filter parameter data, to be applied to reference samples applicable to a current image region. At the encoder side, each filter of the set of two or more filters may be selectable by the selector according to a respective different set of selection criteria dependent upon properties of the image. For example, the properties may include one or more aspects such as: block size, colour component (luma or not, for example), whether a secondary transform is being used, number of non-zero coefficients and the like. At the decoder side, each filter of the set of two or more filters may be selectable by the selector in response to an indication of filter selection in data input to the apparatus.

Various types of filtering have been proposed for the operation of the reference sample filter 1600. For example, the so-called HEVC system employs different reference sample filtering arrangements such as a so-called "strong" filter or a 3-tap filter when a certain set of conditions (which may be referred to as Mode Dependant Intra Smoothing ("MDIS") conditions are met so as to indicate that filtering is to be applied. If filtering is selected under the MDIS conditions, then a set of conditions applicable to the strong filtering are tested, in order to select between the strong filter and the 3-tap filter.

The 3-tap filter uses two neighbouring reference samples such that a particular reference sample is replaced by a filtered version generated from that reference sample and the immediate neighbours. The so-called strong smoothing process uses a subset of reference samples (so-called corner samples) and a linear interpolation process.

In the so-called JEM (Joint Exploration Model) system of the Joint Video Exploration Team (JVET) of ITU-T and ISO/IEC MPEG such as in the JEM 6.0 proposal, two filtering tools have been proposed. One is called reference sample adaptive filtering (RSAF), otherwise known as adaptive reference sample smoothing (ARSS), and the other is called position dependant intra prediction combination (PDPC).

RSAF employs 2 low pass filters (LPFs) which are used to process reference samples. These are: (a) a 3-tap LPF with the coefficients of $(1, 2, 1)/4$; and (b) a 5-tap LPF with the coefficients of $(2, 3, 6, 3, 2)/16$. In some examples, RSAF is available only if:

The channel type is luma
PDPC is disabled for that coding unit
The flag can be hidden (see below)
The transform block size (width*height) is between 64 and 1024
The intra mode is not DC In some examples the RSAF flag indicating that RSAF has been performed at the encoder is not explicitly signalled. Instead, it is hidden in the data using the combined parity of odd transform coefficients. In examples of the use of this technique for luma blocks, its availability is dependent on the parity of the coefficients already being used to hide a coefficient sign bit.

In other proposals such as that defined in the documents JVET-F0055: "non-EE1: explicit flag signalling for ARSS", flag hiding is not performed but instead the ARSS/RSAF flag is explicitly signalled in the case of blocks having at least three non-zero coefficients. The contents of this disclosure are incorporated herein by reference.

The controller 343, in this aspect of its operation, acts upon one or more input parameters 1620. In the case of an encoder, various forms of these input parameters will be discussed below by way of examples. Also in the case of an encoder, the controller 343 generates and encodes in the data stream one or more flags 1630 to indicate the nature of the filtering performed. In the case of a decoder, the controller 343 is responsive to the one or more flags as the input s 1620, and output flags 1630 are not generated.

Figure 17A:
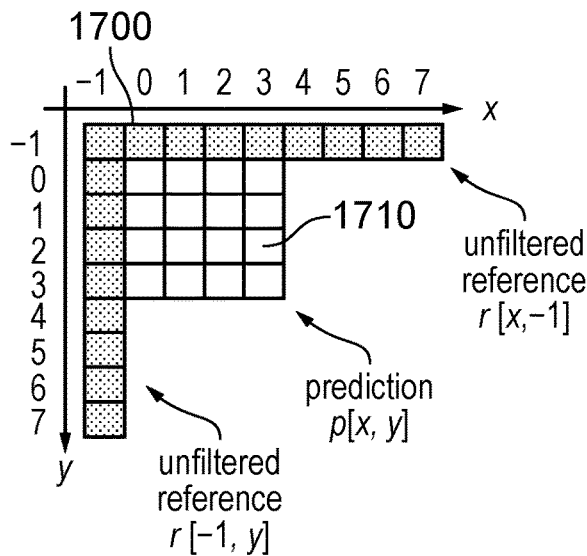
FIGS. 17A and 17B schematically illustrate a PDPC process.
Figure 17B:
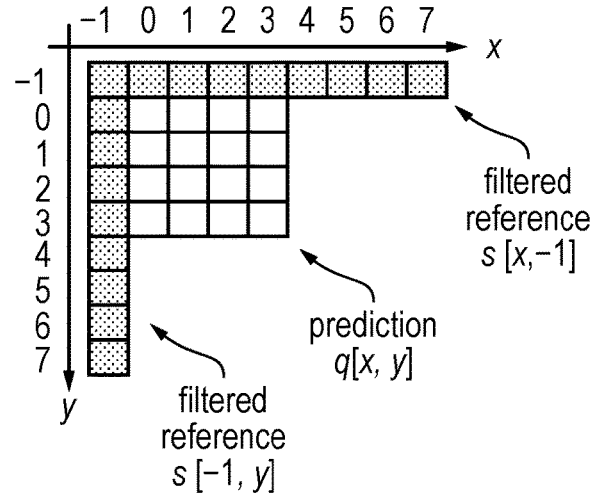

FIGS. 17a and 17b schematically illustrate sample relationships for a PDPC filtering tool. The operation of the tool will be discussed further below with reference to FIGS. 18 and 19.

In FIGS. 17a and 17b, reference samples are shown as shaded blocks 1700 and samples to be predicted as shown as unshaded blocks 1710. A coordinate system [x, y] is used to identify individual reference samples and predicted samples.

Two forms of the reference samples are shown: unfiltered reference samples r[x, y] and filtered reference samples s[x, y] which are equivalent to r[x, y] smoothed by a low-pass filter. A prediction q[x, y] represents an intra prediction based on the filtered reference samples s[x, y]. An output prediction p[x, y] combines weighted elements of r[x, y] with q[x, y]. The weights used to obtain p[x, y] and s[x, y] can depend upon the intra prediction mode specified by the intra mode selector 520.

Figure 18:
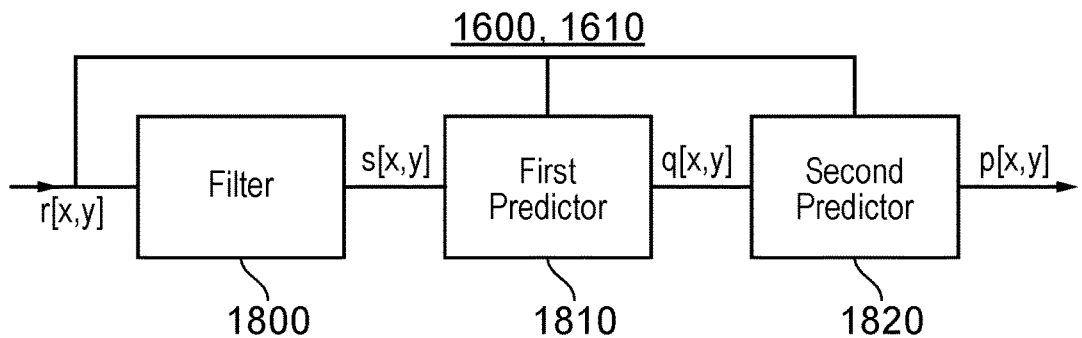
FIG. 18 schematically illustrates a reference sample filter.

FIG. 18 schematically illustrates a reference sample filter 1600 and prediction unit 1610 operating according to the PDPC process. A smoothing filter 1800 acts on r[x, y] to generate s[x, y]. A first predictor 1810 acts on r[x, y] and s[x, y] to generate q[x, y]. A second predictor 1820 acts on q[x, y] and r[x, y] to generate p[x, y].

FIG. 18 therefore provides an example of the reference sample filter comprising at least a low pass filter 1800 and a combiner 1820; and the filtering operation is an operation in which reference samples are combined as a weighted combination with sample values predicted from a filtered version of the reference samples.

Figure 19:
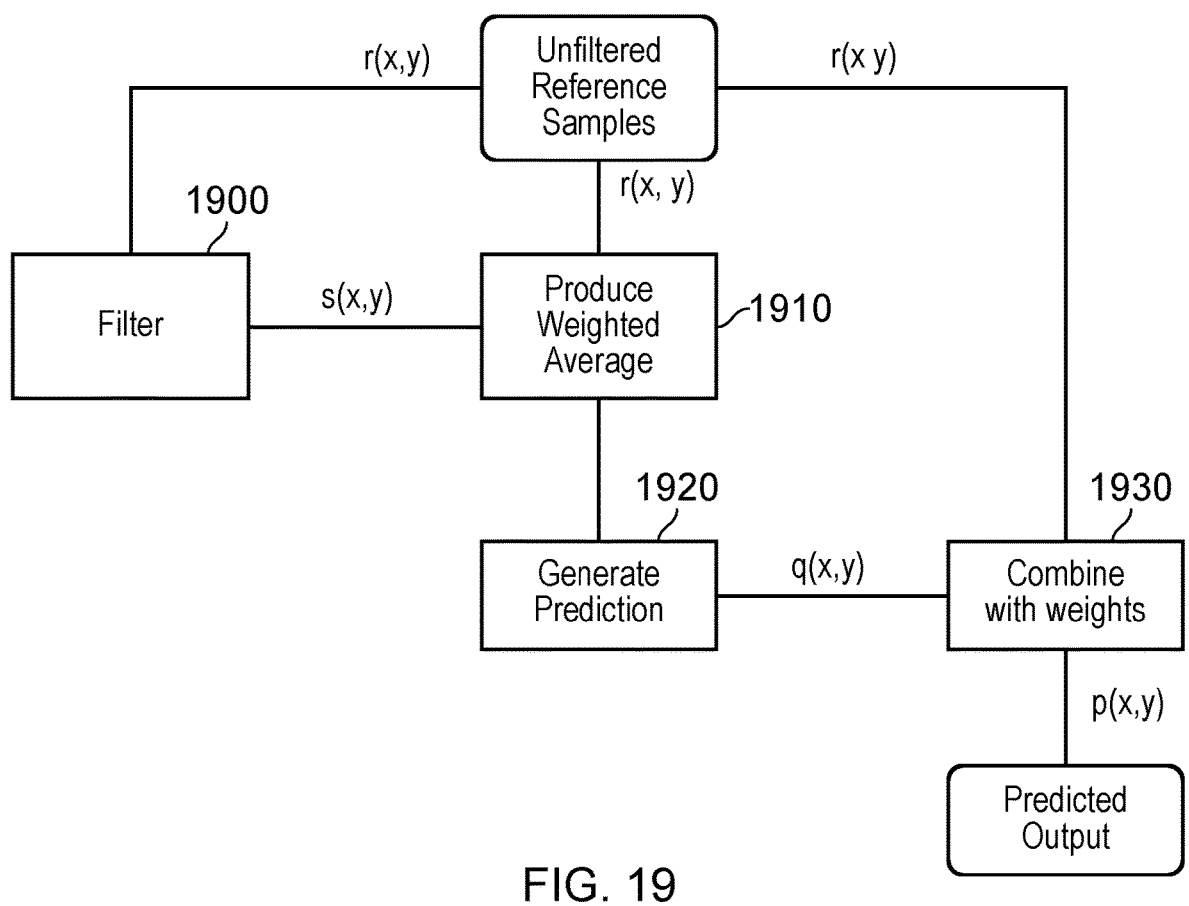
FIG. 19 is a schematic flowchart illustrating a PDPC process.

FIG. 19 is a schematic flowchart illustrating the process discussed above.

At a step 1900, the unfiltered reference samples r[x, y] are filtered by the filter 1800 to generate s[x, y]. At a step 1910, a weighted average of r[x, y] and s[x, y] is generated and provided to a step 1920 of which a prediction q[x, y] is produced. At a step 1930 a weighted combination of r[x, y] and q[x, y] is generated to provide a predicted output p[x, y].

Figure 20:
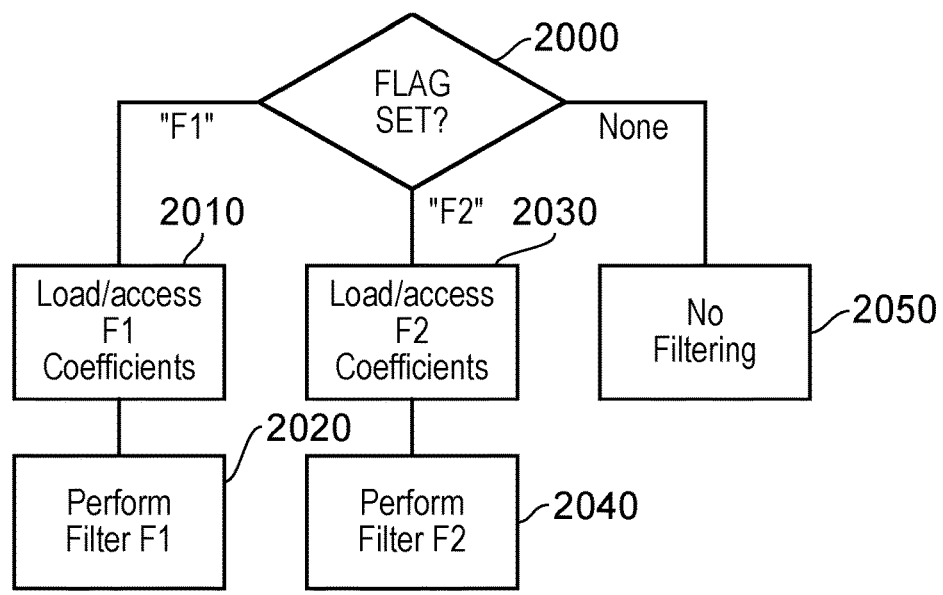
FIGS. 20 and 21 schematically illustrate filtering processes.

FIG. 20 is a schematic flowchart illustrating some aspects of the operation of the intra predictor 530 and the reference sample filter 1600 when more than one type of filter is in use. In the generalised case of FIG. 20, the two filters (being an example of a set of two or more filters, with just two being shown for clarity of the diagram) are referred to as filters F1 and F2. An example of a filter F1 is a PDPC filter. An example of a filter F2 is an RSAF/ARSS filter.

At a step 2000, the controller 343 detects whether a filter flag is set (whether in an explicit or in a hidden form). If a flag is set to indicate the filter F1 then control passes to a step 2010 at which the reference sample filter 1600 loads or accesses filter coefficients corresponding to the filter F1 and at a step 2020 the reference sample filter 1600 performs the operations corresponding to the filter F1.

If, at the step 2000, the flag indicates the filter F2, then control passes to a step 2030 at which the reference sample filter 1600 loads and/or accesses filter coefficients corresponding to the filter F2 and at a step 2040 performs the operations of the filter F2.

If, at the step 2000, no flags are set or the flags indicate no filtering, then control passes to a step 2050 at which the reference sample filter 1600 performs no filtering or the reference sample filter 1600 is bypassed.

Figure 21:
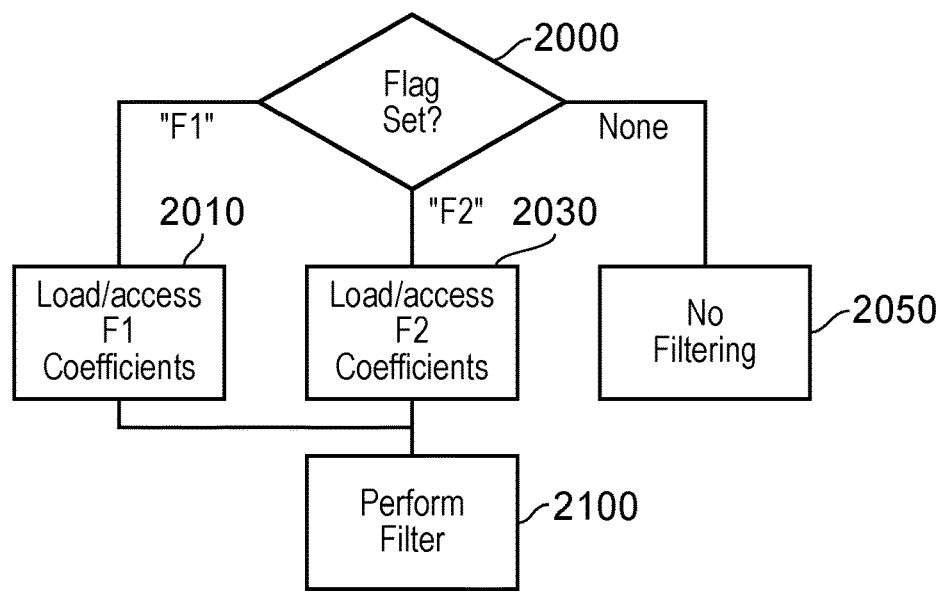

FIG. 21 is a similar schematic flow chart, in which the steps 2000, 2010, 2030, 2050 are identical to those shown in FIG. 20 and will not be described further. However, a difference with respect to FIG. 20 is that the steps 2020, 2040 are replaced by a step 2100. Here, the filter mechanism or algorithm is common to the filters F1 and F2, with the difference being the sets of coefficients which are loaded and/or accessed at the steps 2010, 2030.

In some examples to be discussed below, in place of separate RSAF/ARSS and PDPC filters, a single common algorithm (such as a common PDPC algorithm) is used, but with different sets of coefficients according to the different selection criteria used to enable the RSAF-like operation and the PDPC-like operation. Details of such examples will be given below.

Figure 22:
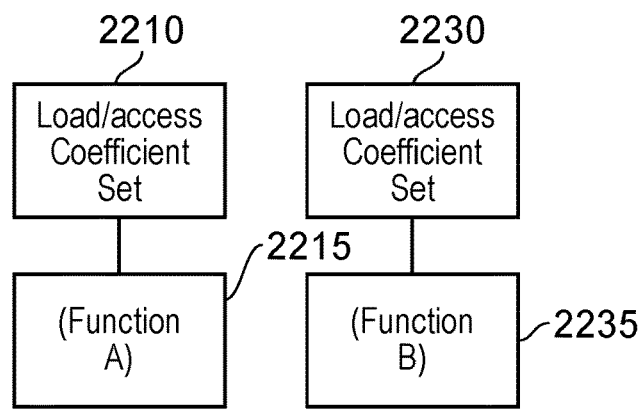
FIG. 22 schematically illustrates a coefficient generation process.

Referring to FIG. 22, the steps 2010 and 2030 can be handled in such a situation as follows. In this example, a single "base" coefficient set is loaded and/or accessed, whether the selection at the step 2000 is for the filter F1 or the filter F2. In FIG. 22, individual steps 2210 and 2230 correspond to the steps 2010 and 2030 of FIG. 21, but these can in fact be coalesced into a single load/access step. Then, for the filter F1, a particular function (function A) is applied to the common coefficient set at a step 2215 and, for the filter F2, a different function (function B) is applied to the common coefficient set at a step 2235.

Note that one of these functions could be "do nothing" in which case the corresponding one of the steps 2215, 2235 would simply not be required. In such examples, the "base" coefficient set is used for one of the filters, and a modification (according to the other function A or B) of that coefficient set is used for the other filter.

In this way, referring to a combination of FIGS. 21 and 22, the system is simplified compared to that of FIG. 20 by (a) the use of a common filter algorithm at the step 2100, and (b) the use of a common base filter coefficient set, with a modification function being used for at least one of the filters F1, F2 in order to generate the required filter coefficients from the common base coefficient set. The use of a common filter technique (even with different parameters) rather than running two different filters can reduce the processing requirements of the encoding or decoding.

Figure 23:
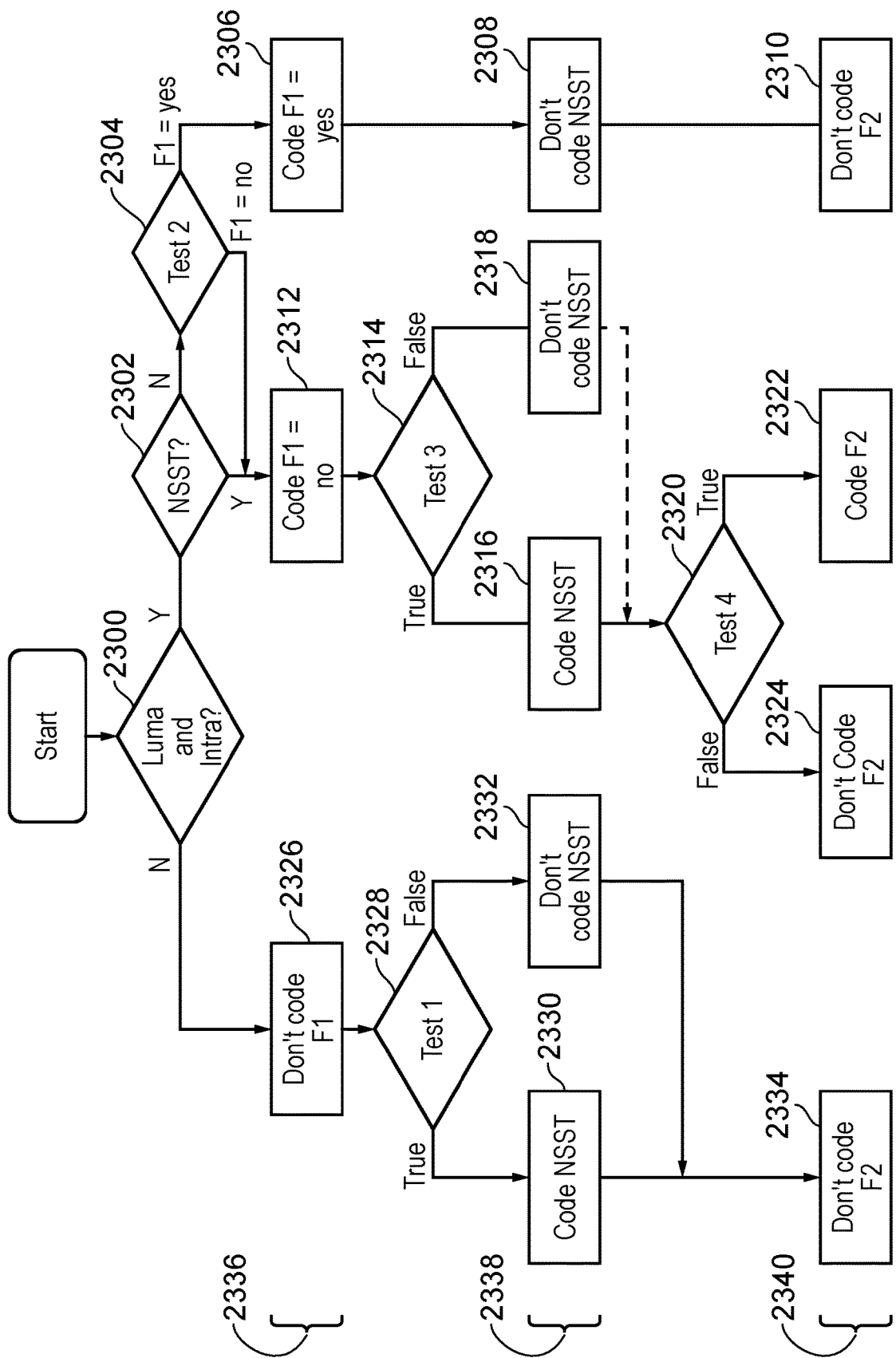
FIG. 23 schematically illustrates a selection process.

FIG. 23 schematically illustrates an example arrangement of to provide flags indicating whether the filter F1, F2 or none should be used in connection with a particular image region such as a coding unit.

In the example shown in FIG. 23, the filter F1 could be, for example, a PDPC filter and the filter F2 could be, for example, an RSAF/ARSS filter.

At a first step 2300, a detection is made as to whether the current block or region is a luma block and also an intra-coded block. If the answer is yet then control passes to a step 2302 which a detection is made as to whether an NSST mode has been provisionally selected for this block. This test can relate to an example parameter RotIdx indicating a selection from one or more NSST modes, with RotIdx=0 indicating that no secondary transform is applied. If RotIdx!=0 (where the notation "!=" indicates "does not equal") this implies "apply NSST". However, a final outcome on whether NSST is applied can depend on a later (in the context of the schematic flowchart) detection as to whether an NSST flag can be encoded.

If the answer is no at the step 2302 (that is to say, RotIdx=0), then control passes to a step 2304 at which a test, test 2 is applied. The test 2 detects whether the filter F1 (for example PDPC) should be applied. For example, this can be on the basis of a trial encoding or a partial trial encoding under the control of the controller 343.

Therefore, the test 2 detects whether the filter F1 should be applied. If the answer is yes then control passes to a step 2306 at which the flag for F1 is set to indicate "apply F1". At a step 2308 the NSST flag is not coded (noting that RotIdx=0) and at a step 2310 the flag for F2 is not coded (noting that F2 is not used, but F1 is being applied).

So, in summary of the "yes" outcome of the step 2304, the flag for F1 is coded as "yes" at the step 2306 if the test 2 is passed and if NSST does not apply.

Returning to the step 2302, if NSST applies or the test 2 (at the step 2304) indicates not to use the filter F1, then control passes to a step 2312 at which the flag for "do not use F1" is coded and a further test 3 is applied at a step 2314. Details of the test 3 are as follows:

number of non-zero coefficients >=threshold number of non-zero coefficients

For example, the threshold number used here can be three.

If the outcome of the test 3 is "true", indicating that the NSST flag can be encoded, then control passes to a step 2316 at which the NSST flag is coded. The NSST flag coded at the step 2316 will indicate "use NSST" (a RotIdx value of other than zero) if the outcome of the step 2302 was "yes". If the outcome of the step 2302 was "no" and control passed to this route via the "F1=no" outcome of the step 2304, then the NSST flag at the step 2316 will indicate "do not use NSST" (RotIdx=0).

If the outcome of test 3 at the step 2314 is false, this indicates that an NSST flag cannot be coded. Control passes to a step 2318 at which the NSST flag is not coded. Therefore, even if an NSST mode was selected (by a non-zero value of RotIdx), if the NSST flag cannot be coded (at the step 2314), NSST is not in fact used for that block. The value of RotIdx is reset to zero. If the encoder has already tested trial (full or partial) encodings with RotIdx equal to zero, the process can simply proceed using those test results. If not, then the current process can be aborted (which is to say, the broken line from the step 2318 to the step 2320 is not followed) and at least some previous steps may need to be repeated with RotIdx forced to a value of zero.

Then, at a step 2320, a test 4 is applied. The test 4 detects whether the filter F2 (such as RSAF/ARSS) can be used. Details of the test 4 are as follows:

(Is F2 available) AND (number of non-zero coefficients >=threshold number of non-zero coefficients for F2)

For example, the threshold number used here can be three.

The test for "is F2 available?" can comprise for example, the test of "is the current prediction mode a mode other than DC, and is the block size (width*height) between 64 and 1024 inclusive?"

This provides an example in which a controller 343 selects a region size of the current image region; and in which the selection criteria applied by the selector include a criterion dependent upon the region size of the current image region.

The test 4 therefore detects whether the filter F2 can be used and its use can be encoded. If the outcome of the step 2320 is true then control passes to a step 2322 at which the flag for "use filter F2" is coded; and if false control passes to a step 2324 at which the flag for the filter F2 is not coded (and F2 is not used).

Returning to the step 2300, if the outcome is no, control passes to a step 2326 at which the flag for the filter F1 is not coded. Control then passes to a step 2328 at which a test 1 is conducted. Details of the test 1 are as follows:

(number of non-zero coefficients >=threshold number of non-zero coefficients) AND ((the block is a luma block) OR (block width >=8 AND block height >=8)) AND NOT (the block is an inter-predicted block AND the block is a chroma block)

If the outcome of the test 1 is true, then control passes to a step 2330 at which the NSST flag (whatever value it is currently set to) is coded. If the outcome of the test 1 is false, control passes to a step 2332 at which the NSST flag is not coded and RotIdx is set to zero to indicate that NSST is not used.

Control then passes to a step 2334 at which the flag for F2 is not coded (and F2 is not used).

It can be seen that FIG. 23 comprises 3 flag-encoding stages:

a stage 2336 at which the flag for the filter F1 is coded or not coded;

a stage 2338 at which the flag for NSST is coded or not coded; and a stage 2340 at which the flag for the filter F2 is coded or not coded.

In the example just discussed, the filter F1 was a PDPC filter, and the filter F2 was an RSAF/ARSS filter. In other examples, to be discussed below, the same decision process could be applied to an arrangement in which the filters F1, F2 are the same filter type, for example, PDPC. Optionally, they may use different respective sets of filter parameters. Optionally, they may use respective sets of filter parameters derived from a common base set of filter parameters (which may in fact be the set of filter parameters used for one of F1 and F2, so that the other of F1 and F2 uses a derived set of parameters). In each of the examples discussed below, unless otherwise indicated, F1 and F2 could be different filters (such as PDPC and RSAF/ARSS) or could be the same filter type (such as PDPC). in each of the examples discussed below, unless otherwise indicated, F1 and F2 could use independent parameters or the parameters for F1 and F2 could be derived from a common base set of parameters, which may or may not be the parameter set for one of F1 and F2.

Figure 24:
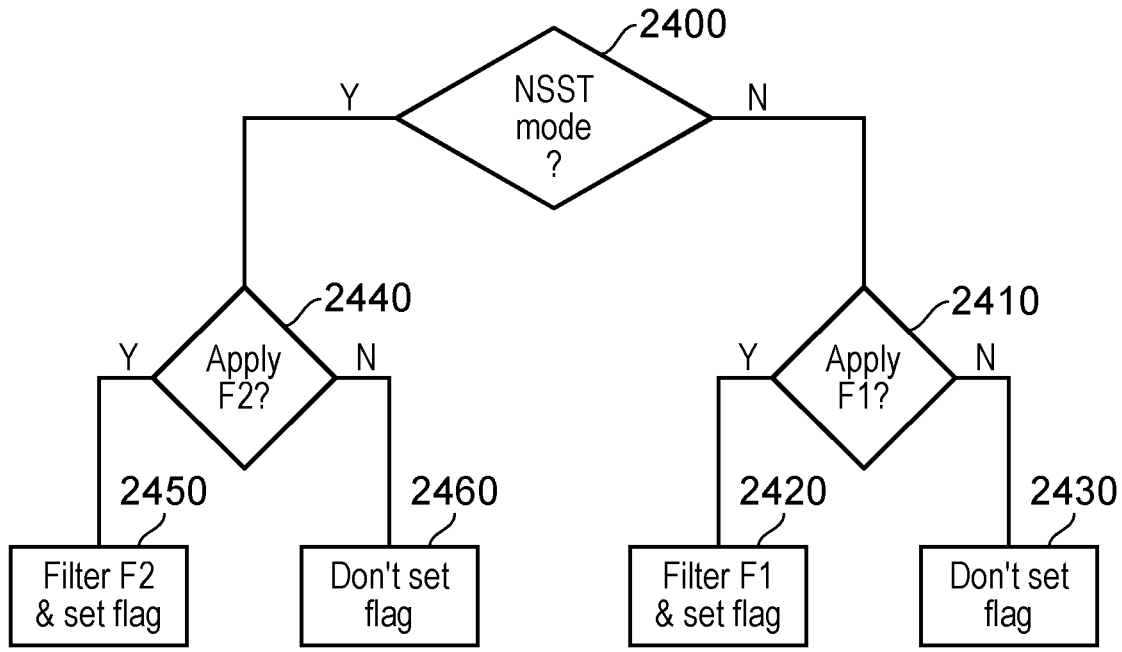
FIGS. 24 and 25 schematically illustrate a selection process.

FIG. 24 schematically illustrates a version of the decision process of FIG. 23 which allows just one "filter" flag to be used to control operation of two filters, F1, F2. Here, the NSST condition is used to determine which of the two filter operations is indicated by the filter flag being set. Basically, if the NSST mode is not applied (a "no" outcome of a step 2400), then if the filter flag is set it indicates that the filter F1 should be used. If the NSST mode is set (a "yes" outcome of the step 2400) then if the filter flag is set it indicates that the filter F2 should be used. It is noted, as discussed above, that the choice of whether or not to use NSST (and indeed a type of NSST defined by RotIdx) can depend not only on factors such as a trial or partial trial encoding, but also on whether the current data allows an NSST flag to be encoded. Therefore, the decision represented schematically by the step 2400 can be a composite decision based on various factors of the type described here.

In these examples, therefore, the set of two or more filters comprises a first filter and a second filter, the first filter being selectable by the selector for the current image region when the data transform circuitry operates in the first mode of operation in respect of the current image region, and the second filter being selectable by the selector for the current image region when the data transform circuitry operates in the second mode of operation in respect of the current image region.

So, returning to FIG. 24, a part of an encoding process is shown, in which at the "no" outcome of the step 2400, a test is applied to determine whether to use the filter F1 at a test 2410. If the outcome is yes then at a step 2420 the filter F1 is used and the filter flag is set. If the outcome is no then at a step 2430 the filter flag is not set (or is set to indicate "no filtering").

On the other hand, if the NSST mode is selected, then at a step 2440 a test can be applied to determine whether to use the filter F2. If the outcome is yes then at a step 2450 the filter F2 is applied and the filter flag is set. If the answer is no then at a step 2460 the filter flag is not set or is set to indicate "no filtering".

In this way, a filter F1 is usable if NSST is not being used (RotIdx=0), and a filter F2 is usable if NSST is being used (RotIdx!=0). This provides an example of the selection criteria applied by the selector include a criterion of whether the data transform circuitry is operating in the first or the second mode of operation in respect of the current image region.

Figure 25:
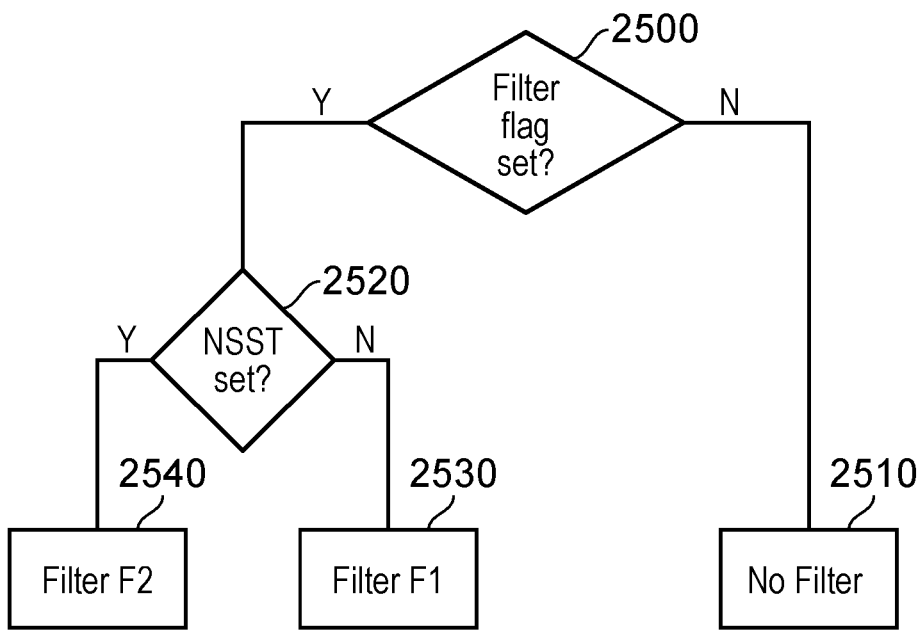

At a decoder side, referring to FIG. 25, at a step 2500, a detection is made as to whether a filter flag is set (or is set to indicate filtering). Therefore the selector is configured to detect from an indication in data input to the apparatus whether a filter should be selected in respect of the current image region. If the filter flag is not set then control passes to a step 2510 at which no reference sample filtering is performed. If the filter flag is set then control passes to a step 2520 at which a detection is made as to whether the NSST mode is in use. If the answer is no (RotIdx=0 or RotIdx is not coded) then control passes to a step 2530 at which the filter F1 is used. If yes, then control passes to a step 2540 at which the filter F2 is used. Therefore, the selector is responsive to whether the data transform circuitry is operating in the first or the second mode of operation in respect of the current image region.

Again, in FIG. 25, the set of two or more filters comprises a first filter and a second filter, the first filter being selectable by the selector for the current image region when the data transform circuitry operates in the first mode of operation in respect of the current image region, and the second filter being selectable by the selector for the current image region when the data transform circuitry operates in the second mode of operation in respect of the current image region.

Figure 26:
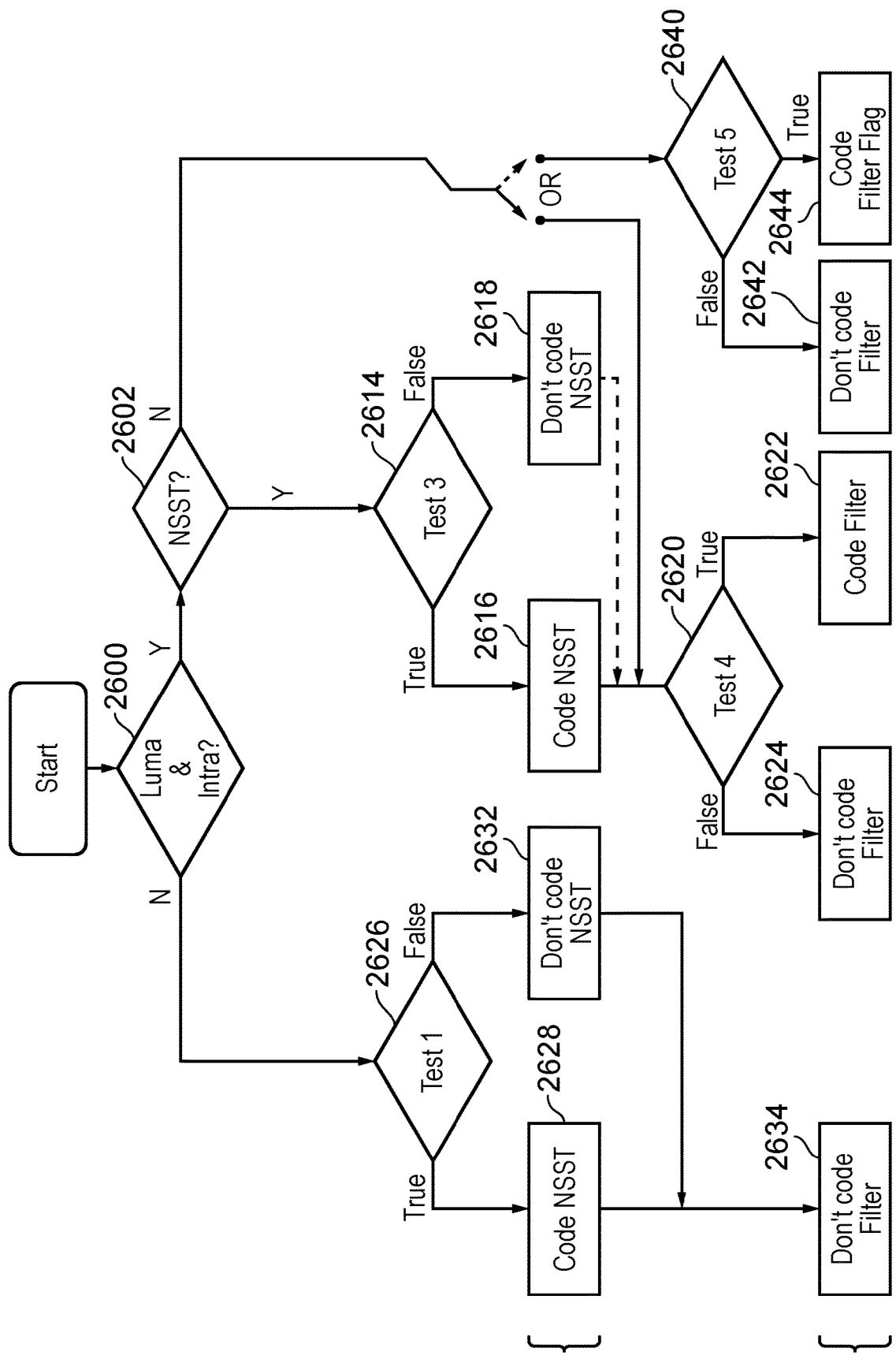
FIG. 26 schematically illustrates a selection process.

FIG. 26 schematically illustrates an example simplified arrangement, based on the overview provided by FIGS. 24 and 25, of to provide flags indicating whether the filter F1, F2 or none should be used in connection with a particular image region such as a coding unit.

There are many similarities between FIG. 23 and FIG. 26. Where individual steps have the same function in FIG. 26 as in FIG. 23, they will not be further described in detail here.

At a first step 2600, a detection is made as to whether the current block or region is a luma block and also an intra-coded block. If the answer is yes then control passes directly to a step 2628 which operates, with steps 2630 and 2632, in the same manner as the steps 2328, 2330 and 2332. The test 1 detects whether the NSST flag can be encoded. Control then passes to a step 2634 at which the single "filter" flag is not coded, and reference sample filtering is not used.

A step 2602 corresponds to the step 2302 at which a detection is made as to whether an NSST mode has been provisionally selected for this block.

If the answer is no at the step 2602 (that is to say, RotIdx=0), then in an example arrangement control passes to a step 2640 at which a test5 is applied. Test 5 may be, for example:

number of non-zero coefficients >=threshold number of non-zero coefficients (where the threshold number can be the threshold applicable to encoding an RSAF flag, for example, allowing the RSAF flag encoding mechanism to be used).

If the outcome of the step 2640 is false, then at a step 2642 the filter flag is not coded and filtering is not used. If the outcome is true, then at a step 2644 the filter flag is coded.

In another different example, from the "no" outcome of the step 2602, control can pass to a step 2620. In such an example, the steps 2640, 2642 and 2644 are not used.

Returning to the yes outcome of the step 2602 (RotIdx!=0), control passes to a step 2614 at which test 3 is applied. In this way, the step 2614 and subsequent steps 2616, 2618, 2620, 2622 and 2624 correspond in function to the step 2314 and subsequent steps 2316, 2318, 2320, 2322 and 2324 of FIG. 23. As discussed above, the step 2618 can terminate the process or, in other examples as indicated by a broken line, the process can continue from the step 2618 to the step 2620. These steps provide an example in which the apparatus is configured to indicate within data output by the apparatus whether the data transform circuitry is operating in the first or the second mode of operation, in which: the apparatus is configured to selectively modify encoded data generated by the apparatus so as to indicate operation of the data transform circuitry in the second mode of operation, subject to the encoded data meeting a first modification criterion; and the data transform circuitry is configured to operate in the first mode of operation (the step 2618) when the encoded data does not meet the first modification criterion. The test at the step 2620 provides an example in which the apparatus is configured to selectively modify encoded data for output by the apparatus so as to indicate selection of a filter by the selector, subject to the encoded data meeting a second modification criterion; and the selector is configured not to select a filter (the step 2624) when the encoded data does not meet the second modification criterion. The test 4 is an example in the second modification criterion is that data output by the data transform circuitry for the current image region comprises at least a predetermined number of non-zero data values.

The bottom row of steps (as drawn) in FIG. 26 therefore provides an example in which the apparatus is configured to indicate within data output by the apparatus whether a filter has been selected by the selector in respect of the current image region.

FIG. 27 schematically represents a set of filter coefficients for use in a PDPC process of the type discussed above. In this example, the filter parameter data comprise one or both of:

parameters defining operation of the low pass filter; and
parameters defining the weighted combination.

The data provided is an array of parameters depending on block size and intra mode. The data shown in FIG. 27 represent ordered sets of parameters or coefficients {p1,p2,p3,p4,p5,p6}, arranged as successive ordered sets, in an overall order (that is to say, an order of occurrence of the ordered sets) to be discussed below.

Within an individual ordered set, which in this example applies to a specific corresponding block size and intra mode, there are 6 parameters {p1,p2,p3,p4,p5,p6}. The parameters p1, p2, p3, p4 are weights that will affect how reference samples r [x, y] (unfiltered) and a temporary prediction q[x, y] (from filtered reference samples) will be combined to form the final prediction.

The process of filtering the reference samples r[x, y] (to obtain the "filtered reference samples" s[x, y]), the process (in this example) uses a weighted average of the result of a 3/5/7-tap filter applied to unfiltered reference samples, and the original unfiltered reference samples. This weighted average has a weight of p5 (for original unfiltered samples) and the filter applied has an order of p6 (that is to say, the parameter p6 indicates whether a 3-tap, 5-tap or 7-tap and with which values). In particular, the parameter p6 indicates:

| Parameter p6 | Filter | Coefficients |
|---|---|---|
| 0 | no filter | |
| 1 | 3 tap LPF | [1 2 1]/4 |
| 2 | 5 tap LPF | [1 4 6 4 1]/16 |
| 3 | 7 tap LPF | [1 6 15 20 15 6 1]/64 |
| 5 | 7 tap LPF | [3 7 14 16 14 7 3]/64 |
| 7 | 7 tap LPF | [4 9 12 14 12 9 4]/64 |

The way the temporary prediction q[x, y] is combined with the unfiltered reference samples r[x, y] is:

For p[x, y] of the current prediction (x being row, y being column as shown in FIGS. 17A and 17B):

p1 is the weight of the unfiltered reference sample of row x (on the left)

p3 is the weight of the unfiltered reference sample of column y (on the top)

p2+p4 is the weight of the top-left unfiltered reference sample

Note that p1, p2, p3, p4 are different for each size group and intra mode group. For a current block of iWidth and iHeight, p1 and p2 are determined from the index size=iWidth, whereas p3 and p4 are determined from the index size=iHeight. For p5 and p6, the "size" used (for example in a so-called g_pdpc_param parameter) is the largest of width and height.

Figure 12:
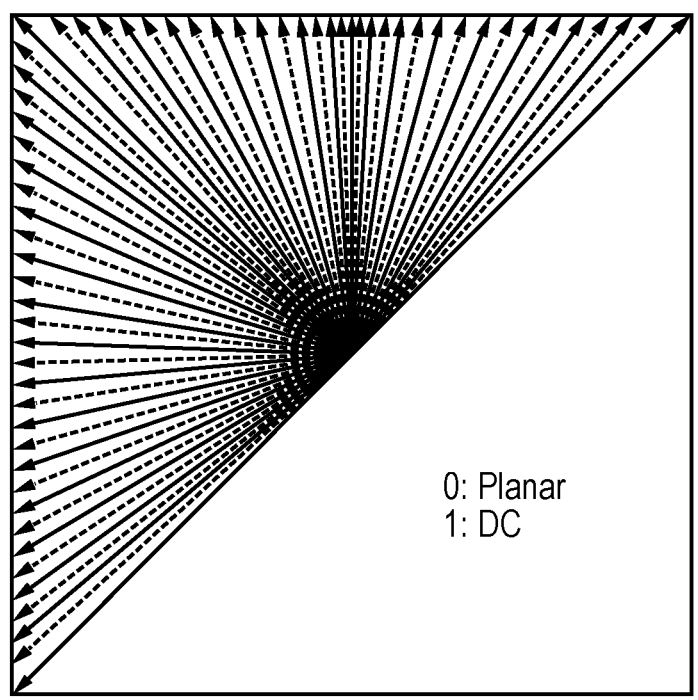
FIG. 12 schematically illustrates another set of prediction modes.

The ordering of the data shown in FIG. 27 is indicated by the text at the top of FIG. 27 as drawn, namely that the data are recited in FIG. 27 in five successive groups 2700 . . . 2740, each group corresponding to a block size parameter, with each group containing 35 ordered sets each of six parameters p1 . . . p6, with the ordered sets corresponding to symmetrical pairs of the prediction modes of FIG. 12.

Referring back to FIG. 22, a function can be used to derive the parameters from one of the filters F1, F2 from a base set of parameters. It was discussed in connection with FIG. 22 that each of the filters F1, F2 could employ such a function, or one of the filters F1, F2 could use the base set of parameters.

With regard to the example of FIG. 27, the parameters shown are employed for the filter F1 (the PDPC filter in the present examples). Therefore, the step 2215 of FIG. 22 is not used, or the function A of the step 2215 is "no change" in these examples. In order to derive the parameters for the filter F2 (which uses a PDPC algorithm but different parameters), the function B employed at the step 2235 is applied to the ordered set of parameters selected according to the block size and prediction mode, and is as follows:

p1»1 (where the notation "X»n" implies that the value X is right-shifted by n bit positions)

p2»1 p3»1 p4»1 p5»1 p6 (unchanged).

In an alternative example, the parameter p5 could remain unchanged instead of being shifted.

The controller 343, operating in accordance with the step 2235, therefore provides an example of a processor configured to generate the filter parameter data for at least one of the filters of the set of two or more filters by applying a predetermined processing operation to the filter parameter data for another of the filters of the set of two or more filters.

In the discussions above, properties of the current region to be encoded are used as the basis of the decisions on which filter to use. Other examples will now be described.

In particular, at least some of the tests discussed in connection with FIGS. 23 and 26 make use of the number of non-zero coefficients. These tests require the outcome of the transform process by the transform unit 340, either in respect of a trial encoding or a full (final) encoding, and this means in turn that the decision on what filtering is used and encoded cannot be made until relatively late in the encoding process.

As background to some of these alternative examples, some aspects of an encoding block structure will first be described.

In general, in the present examples, all three components (such as Y,Cb,Cr) may be encoded, for example using an identical block structure, although different block structures for the different components may be employed. A CU refers to a coding unit; a PU refers to a prediction unit and defines the parameters for the prediction unit; and a TU refers to a transform unit, or in other words the block of data that is to be transformed The HEVC system uses a system of a so-called quad tree (having a root node and a set of leaf nodes) of CUs, where each leaf CU represents one or more PUs. Each leaf CU represents the root of a transform quad tree.

The JEM system uses QTBT (quad tree binary tree), in that each root CU splits down by a quad tree. Each leaf then optionally splits further with a binary tree. Each of those leaves then represents a PU, CU, TU without distinction.

Figure 28:
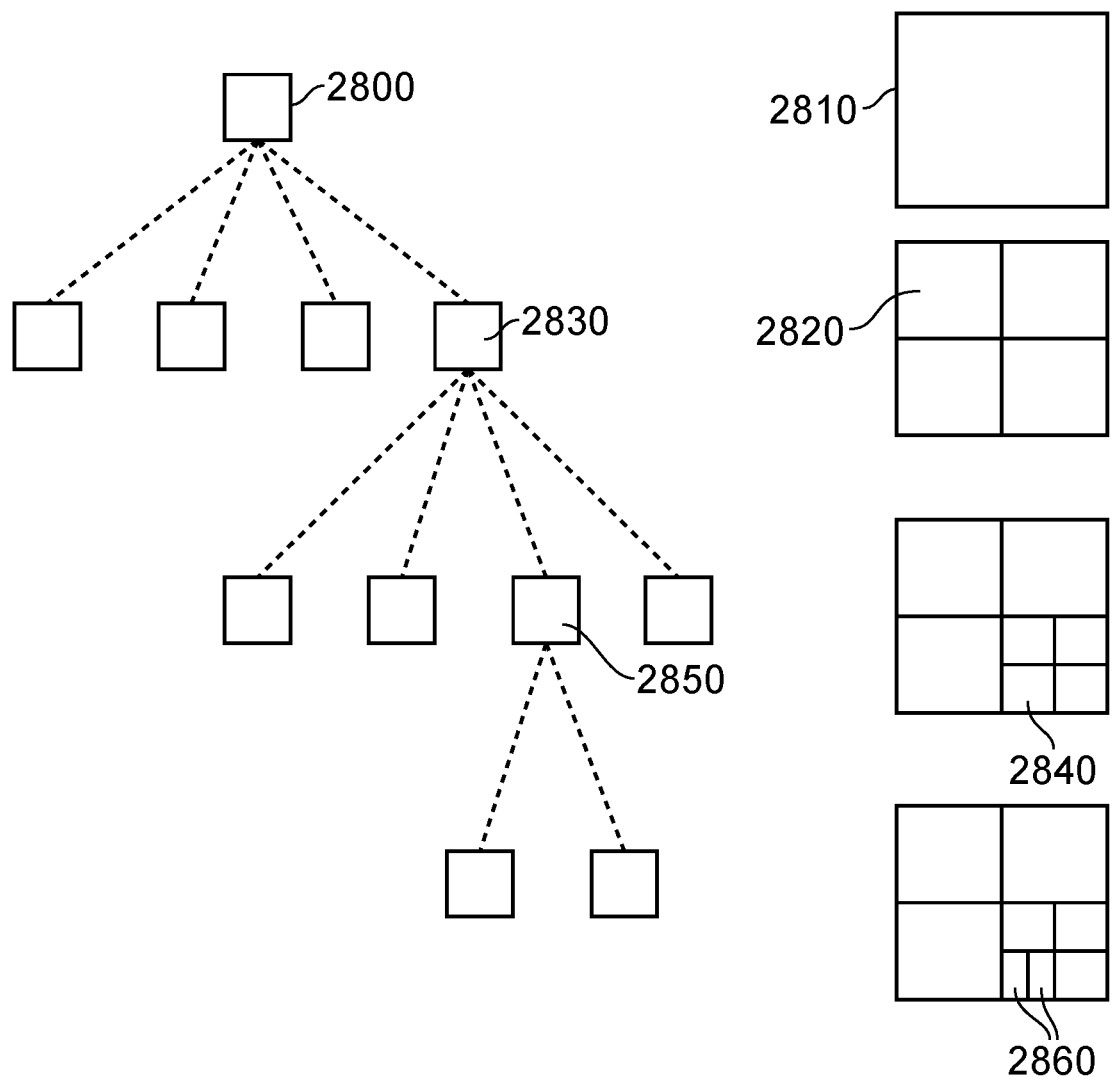
FIG. 28 schematically illustrates a hierarchical block division.

As an example, FIG. 28 schematically illustrates a so-called root coding unit (CU) 2800, shown as a region 2810 on the right hand side of FIG. 28. A quad tree division of the root CU 2800 produces four sub CUs 2820, one of which 2830 is shown as being divided by a further four-way division into smaller CUs 2840, one of which 2850 is split by a binary division into coding units 2860.

This arrangement provides an example in which a current image region is a sub-region of a larger image region in a hierarchy of image regions.

Further examples will now be discussed with reference to FIGS. 29-32. These techniques can apply to many different cases. For example, if it is suspected or predicted from one of the prediction techniques that there are a lot of (such as three or more) non-zero coefficients, more effort can be devoted to producing lots of flags to represent them. Flags whose availability could be controlled in this way include transform skip, NSST, RSAF, PDPC, a unified filter such as a unified-PDPC approach (as discussed in connection with FIG. 26 and others, for example), a so-called qp-delta which signals changes in a quantisation parameter at a local (block or region) level. In other examples, a flag, which is only present when a proxy block (or in other words, data derived in respect of a previously coded and/or neighbouring and/or nearby block) says it is, can indicate that multiple additional flags would be present, which is to say that if it is predicted that there is a lot of information present, then a flag can be sent to say "allow plural settings", with those settings being coded in subsequent data as well.

In general terms, a prediction can be made from another block or blocks as to whether a current block or region meets one or more predetermined criteria, such as whether the block will be encoded with more than a certain number of non-zero coefficients, and/or or will have a certain (or a certain minimum) size or the like, allowing a decision to be made in the flowcharts of FIGS. 23-26 without the need to obtain this information by a full encoding of the current region.

Figure 29:
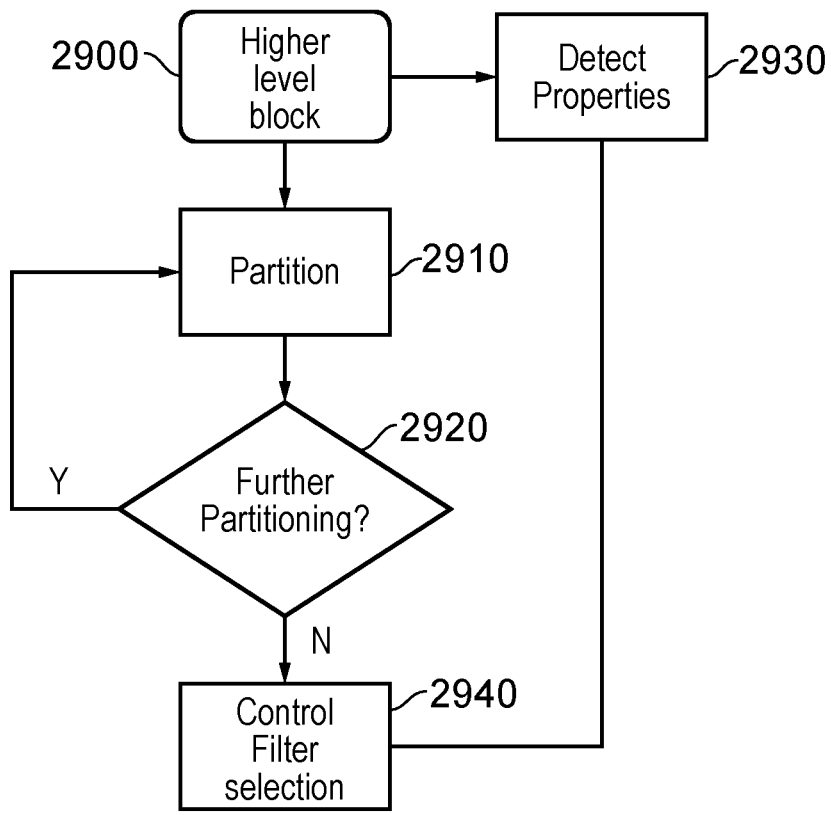
FIGS. 29 to 36 schematically illustrate respective methods.

FIG. 29 schematically illustrates an example technique to allow an earlier decision to be made on filter selection, rather than having to carry out parts of the encoding process before the decision can even be calculated. This can make use of a dedicated signalling scheme as between different stages of the encoding process.

The example of FIG. 29 uses the tree-based decision (whether quad tree or binary tree) of FIG. 28, in which a higher level block such as a root block or the blocks 2830, 2850 2900 is partitioned using the example processes shown in 28 at a step 2910. If further partitioning is required at a step 2920 then control returns to this step 2910. Properties of the higher level block are detected at a step 2930 and are used to control filter selection in respect of the smaller block at a step 2940. In this example, the one or more properties of one or more image regions other than the current image region comprise one or more properties of one or more larger image regions, higher within the hierarchy of image regions. In this way, the steps 2318 and 2618 discussed above are not applicable to the smaller blocks, as this path, in which NSST is selected initially by RotIdx!=0 but is subsequently found not to be able to be coded, cannot occur.

Figure 30:
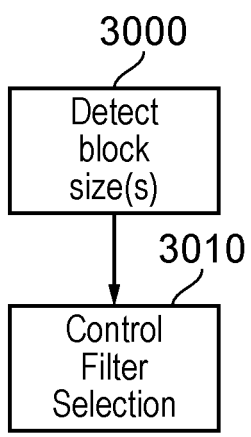

FIG. 30 schematically illustrates another optional technique in which the block size(s) of one or more blocks adjacent to or near to a current block, or those which have been recently coded (even if not spatially nearby), which have already been encoded, are used as a proxy for the information required to select a filter, in that at a step 3000 the block sizes are one or more nearby or adjacent blocks are detected and at a step 3010 that information is used to control filter selection in respect of a current block. This provides an example in which the one or more properties of one or more image regions other than the current image region comprise a region size of the one or more image regions. For example, the one or more properties of one or more image regions other than the current image region comprise a difference in region size of the one or more image regions with the region size of the current image region. FIG. 30 therefore uses neighbouring/nearby and/or recently coded block sizes. For example, when smaller blocks are being used, there is often a higher probability of more coefficients because there is detail in the picture. Therefore a reduction in block sizes could allow signalling of flags. However, note that very small blocks, signalling might not be applicable as these often do not require filtering to be applied.

Figure 31:
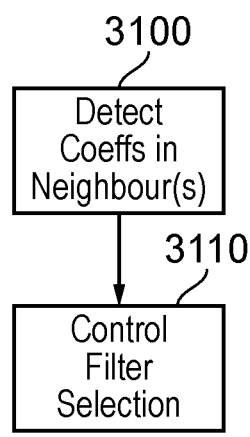

In FIG. 31, the number of non-zero coefficients in one or more nearby and/or adjacent and/or recently coded (even if not spatially nearby) blocks is used to control filter selection for a current block. At a step 3100, the number of non-zero coefficients in one or more neighbouring blocks (adjacent or nearby) which have already been encoded is detected and at a step 3110 this information is used to control filter selection for the current block. This provides an example in which the one or more properties of one or more image regions other than the current image region comprise a number of non-zero data values generated in respect of the one or more other image regions. The technique of FIG. 31 therefore uses neighbouring/nearby and/or recently coded data content. Use of neighbouring/nearby and/or recently coded data can be useful for predicting the distribution of data in a current block. The choice of which other block or blocks could also be controlled by intra prediction direction. For example, if the neighbouring block to the left (if available) has "many" (such as at least a threshold number, for example at least three) (non-zero) coefficients, and the current block is predicting with a horizontal mode (or a mode which is substantially horizontal, for example within +/−3 modes of horizontal (in the 35 mode arrangement of FIG. 11, or in other words modes 7-13) or +/−6 modes of horizontal (in the 67 mode arrangement of FIG. 12), then it is likely that the current block is also going to also have many coefficients, and therefore the flag should be signalled. Similarly, for a prediction mode which is further to the lower left than the range indicative of substantially horizontal (for example modes 2-6 in FIG. 11), the number of coefficients applicable to a lower left adjacent or nearby block (if available)—or at least whether the block has "many" non-zero coefficients—can be used as a predictor for the number of coefficients (or whether the block has many non-zero coefficients) in the current block. Further examples (according to the mode numbering of FIG. 11, purely as an example) can include:

modes 23-29 (substantially vertical, or vertical+/−3): use the block above, if available, as a predictor modes 14-22: use the block diagonally above-left, if available, as a predictor modes 30-34: use the block diagonally above-right, if available, as a predictor.

Figure 32:
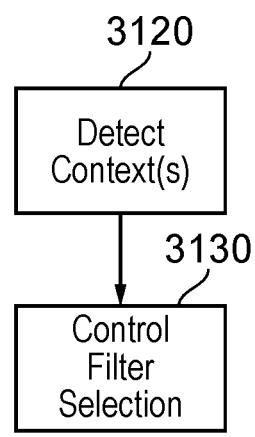

FIG. 32 concerns the use of CABAC contexts of previously encoded blocks (such as nearby or neighbouring blocks), or more generally examples in which the one or more properties of one or more image regions other than the current image region comprise one or more arithmetic coding contexts applicable to the one or more regions These represent the probability of different flags being signalled. In examples, the CBF flag (coded-block-flag), which represents the probability of the current block having some coefficients, or the LAST_X/LAST_Y coefficient position contexts in combination could be used to give an indication on how likely the current block is to have a certain number of coefficients. Or a pseudo-CABAC context (one that is not coded) could be provided, which represents a different useful probability, such as the probability a given type of block has at least 3 coefficients in it (like a CBF, but represents Probability (>=3 sig (non-zero) coefficients), rather than Probability (>=1 sig coefficients). Referring to FIG. 32, at a step 3120, one or more CABAC contexts are detected, and at a step 3130, filter selection is controlled based upon the detection.

The apparatus of FIG. 7, operating according to any of these techniques of FIGS. 29-32, therefore provides an example of an apparatus comprising: an image data encoder (or decoder—see the note below) to encode (or decode) a current image region of an image, the image data encoder being operable in at least two modes of operation (for example, F1, F2 or no filter; and/or NSST/no NSST); a controller 343 to control operation of the image data encoder (or decoder) in dependence upon the encoded data for the current image region meeting a predetermined criterion; and prediction circuitry (implemented by the controller 343) configured to predict, from one or more properties of one or more image regions (for example, one or more image regions other than the current image region), whether the encoded data for the current image region will meet the predetermined criterion. In the case of NSST/no NSST, examples provide data transform circuitry configured to apply one or more data transforms to data representing the current image region; in which the predetermined criterion is that data output by the data transform circuitry for the current image region comprises at least a predetermined number of non-zero data values. Note that the techniques are applicable to decoders as well as to encoders. At a decoder, the same prediction techniques of whether a mode of operation is available are used, in order that the decoder can then (for example) look for a flag or other signal to detect whether such a filter or other mode of operation is in fact being used.

The controller 343 can provide an example of comprising indicator circuitry configured to selectively modify encoded data generated by the apparatus in respect of the current image region so as to indicate operation of the image data encoder in a first mode of the at least two modes of operation, subject to the encoded data for the current image region meeting the predetermined criterion, the image data encoder being configured not to operate in the first mode of operation when the encoded data does not meet the predetermined criterion.

In the above examples, the one or more image regions other than the current image region comprise one or more image regions neighbouring the current image region. In examples, the one or more image regions other than the current image region comprise one or more image regions encoded before the current image region.

FIG. 32 is a schematic flowchart illustrating an image encoding method comprising:

intra-image predicting (at a step 3200) a current sample of a current image region, of a plurality of regions of an image, with respect to one or more corresponding reference samples of the same image according to a prediction direction between the current sample and a reference position amongst the reference samples;

selecting (at a step 3210) a filter, of a set of two or more filters each defined by the same filtering operation and a respective different set of filter parameter data, to be applied to reference samples applicable to a current image region, each filter of the set of two or more filters being selectable by the selector according to a respective different set of selection criteria dependent upon properties of the image;

selectively applying (at a step 3220) the selected filter to at least some of the reference samples corresponding to the current region.

Figure 33:
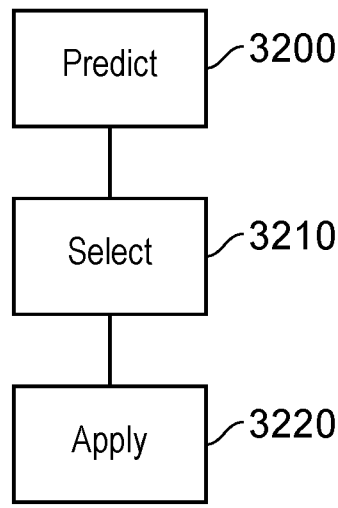

FIG. 33 is a schematic flowchart illustrating an image decoding method comprising:

intra-image predicting (at a step 3300) a current sample of a current image region, of a plurality of regions of an image, with respect to one or more corresponding reference samples of the same image according to a prediction direction between the current sample and a reference position amongst the reference samples;

selecting (at a step 3310) a filter, of a set of two or more filters each defined by the same filtering operation and a respective different set of filter parameter data, to be applied to reference samples applicable to a current region, each filter of the set of two or more filters being selectable by the selector in response to an indication of filter selection in data input to the apparatus; and selectively applying (at a step 3320) the selected filter to at least some of the reference samples corresponding to the current region.

Figure 34:
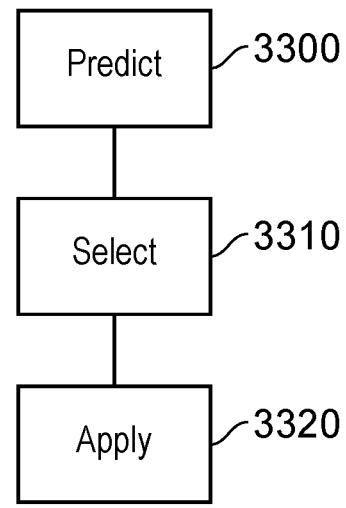

FIG. 34 is a schematic flowchart illustrating a method comprising:

encoding (at a step 3400) a current image region of an image, according to one of at least two modes of operation;

controlling (at a step 3410) a mode of operation of the encoding step in dependence upon the encoded data for the current image region meeting a predetermined criterion; and predicting (at a step 3420), from one or more properties of one or more image regions other than the current image region, whether the encoded data for the current image region will meet the predetermined criterion.

Figure 35:
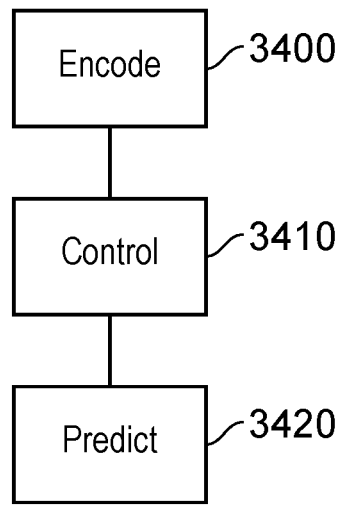
Figure 36:
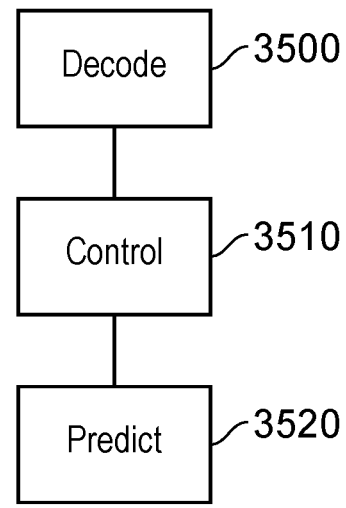

FIG. 35 is a schematic flowchart illustrating a method comprising:

decoding (at a step 3500) a current image region of an image, according to one of at least two modes of operation;

controlling (at a step 3510) a mode of operation of the decoding step in dependence upon the encoded data for the current image region meeting a predetermined criterion; and predicting (at a step 3520), from one or more properties of one or more image regions other than the current image region, whether the encoded data for the current image region will meet the predetermined criterion.

The techniques discussed above can apply in isolation to one or more components of a video sampling scheme, for example when luminance and or chrominance and/or components of chrominance samples are differently sampled.

It will be appreciated that the various different techniques described can be combined so that the selection of the set of candidate modes applicable to a sample or to a block or region of samples can take into account any permutation of one or more (being a subset or the whole group) of considerations or aspects discussed above.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective example embodiments are disclosed by the following numbered clauses:

1. Apparatus comprising:
   an image data encoder to encode a current image region of an image, the image data encoder being operable in at least two modes of operation;
   a controller to control a mode of operation of the image data encoder in dependence upon the encoded data for the current image region meeting a predetermined criterion; and
   prediction circuitry configured to predict, from one or more properties of one or more image regions other than the current image region, whether the encoded data for the current image region will meet the predetermined criterion.

2. Apparatus according to clause 1, comprising:
   data transform circuitry to apply one or more data transforms to data representing the current image region;
   in which the predetermined criterion is that data output by the data transform circuitry for the current image region comprises at least a predetermined number of non-zero data values.

3. Apparatus according to clause 2, in which the one or more data transforms comprise one or more of:
   a primary transform;
   a primary transform and a secondary transform;
   an enhanced multiple transform; and
   an adaptive multiple transform.

4. Apparatus according to clause 2 or clause 3, in which the data transform circuitry is configured to selectively operate in a transform-skip mode in which a transform is not applied.

5. Apparatus according to any one of the preceding clauses, comprising:

an intra-image predictor to predict a current sample of a current image region, of a plurality of regions of an image, with respect to one or more corresponding reference samples of the same image according to a prediction direction between the current sample and a reference position amongst the reference samples;

a selector to select a filter of a set of two or more filters in response to the predetermined criterion; and a reference sample filter to selectively apply the selected filter to at least some of the reference samples corresponding to the current region.

6. Apparatus according to any one of the preceding clauses, comprising indicator circuitry configured to selectively modify encoded data generated by the apparatus in respect of the current image region so as to indicate operation of the image data encoder in a first mode of the at least two modes of operation, subject to the encoded data for the current image region meeting the predetermined criterion, the image data encoder being configured not to operate in the first mode of operation when the encoded data does not meet the predetermined criterion.

7. Apparatus according to any one of the preceding clauses, in which the one or more properties of one or more image regions other than the current image region comprise a region size of the one or more image regions.

8. Apparatus according to clause 7, in which the one or more properties of one or more image regions other than the current image region comprise a difference in region size of the one or more image regions with the region size of the current image region.

9. Apparatus according to clause 2, in which the one or more properties of one or more image regions other than the current image region comprise a number of non-zero data values generated in respect of the one or more other image regions.

10. Apparatus according to any one of the preceding clauses, in which the current image region is a sub-region of a larger image region in a hierarchy of image regions; and the one or more properties of one or more image regions other than the current image region comprise one or more properties of one or more larger image regions, higher within the hierarchy of image regions.

11. Apparatus according to clause 2, in which the one or more properties of one or more image regions other than the current image region comprise one or more arithmetic coding contexts applicable to the one or more regions.

12. Apparatus according to any one of the preceding clauses, in which the one or more image regions other than the current image region comprise one or more image regions neighbouring the current image region.

13. Apparatus according to any one of the preceding clauses, in which the one or more image regions other than the current image region comprise one or more image regions encoded before the current image region.

14. Apparatus comprising:

an image data decoder to decode a current image region of an image, the image data decoder being operable in at least two modes of operation;

a controller to control a mode of operation of the image data decoder in dependence upon the encoded data for the current image region meeting a predetermined criterion; and prediction circuitry configured to predict, from one or more properties of one or more image regions other than the current image region, whether the encoded data for the current image region will meet the predetermined criterion.

15. Apparatus according to clause 14, comprising:

data transform circuitry to apply one or more data transforms to data representing the current image region;

in which the predetermined criterion is that data output by the data transform circuitry for the current image region comprises at least a predetermined number of non-zero data values.

16. Apparatus according to clause 15, in which the one or more data transforms comprise one or more of:

a primary transform;

a primary transform and a secondary transform;

an enhanced multiple transform; and an adaptive multiple transform.

17. Apparatus according to clause 15 or clause 16, in which the data transform circuitry is configured to selectively operate in a transform-skip mode in which a transform is not applied.

18. Apparatus according to any one of clauses 14 to 17, comprising:

an intra-image predictor to predict a current sample of a current image region, of a plurality of regions of an image, with respect to one or more corresponding reference samples of the same image according to a prediction direction between the current sample and a reference position amongst the reference samples;

a selector to select a filter of a set of two or more filters in response to the predetermined criterion; and a reference sample filter to selectively apply the selected filter to at least some of the reference samples corresponding to the current region.

19. Apparatus according to any one of clauses 14 to 18, comprising indicator circuitry configured to selectively modify encoded data generated by the apparatus in respect of the current image region so as to indicate operation of the image data encoder in a first mode of the at least two modes of operation, subject to the encoded data for the current image region meeting the predetermined criterion, the image data encoder being configured not to operate in the first mode of operation when the encoded data does not meet the predetermined criterion.

20. Apparatus according to any one of clauses 14 to 19, in which the one or more properties of one or more image regions other than the current image region comprise a region size of the one or more image regions.

21. Apparatus according to clause 20, in which the one or more properties of one or more image regions other than the current image region comprise a difference in region size of the one or more image regions with the region size of the current image region.

22. Apparatus according to clause 15, in which the one or more properties of one or more image regions other than the current image region comprise a number of non-zero data values generated in respect of the one or more other image regions.

23. Apparatus according to any one of clauses 14 to 22, in which the current image region is a sub-region of a larger image region in a hierarchy of image regions; and the one or more properties of one or more image regions other than the current image region comprise one or more properties of one or more larger image regions, higher within the hierarchy of image regions.

24. Apparatus according to clause 15, in which the one or more properties of one or more image regions other than the current image region comprise one or more arithmetic coding contexts applicable to the one or more regions 25. Apparatus according to any one of clauses 14 to 24, in which the one or more image regions other than the current image region comprise one or more image regions neighbouring the current image region.

26. Apparatus according to any one of clauses 14 to 25, in which the one or more image regions other than the current image region comprise one or more image regions encoded before the current image region.

27. Video storage, capture, transmission or reception apparatus comprising apparatus according to any one of clauses 1 to 13.

28. Video storage, capture, transmission or reception apparatus comprising apparatus according to any one of clauses 14 to 26.

29. A method comprising:
encoding a current image region of an image, according to one of at least two modes of operation;
controlling a mode of operation of the image data encoding in dependence upon the encoded data for the current image region meeting a predetermined criterion; and
predicting, from one or more properties of one or more image regions other than the current image region, whether the encoded data for the current image region will meet the predetermined criterion.

30. Computer software which, when executed by a computer, causes the computer to carry out a method according to clause 29.

31. A machine-readable non-transitory storage medium which stores software according to clause 30.

32. A data signal comprising coded data generated according to the method of clause 29.

33. A method comprising:
decoding a current image region of an image, according to one of at least two modes of operation;
controlling a mode of operation of the image data decoding in dependence upon the encoded data for the current image region meeting a predetermined criterion; and
predicting, from one or more properties of one or more image regions other than the current image region, whether the encoded data for the current image region will meet the predetermined criterion.

34. Computer software which, when executed by a computer, causes the computer to carry out a method according to clause 33.

35. A machine-readable non-transitory storage medium which stores software according to clause 34.

36 A video capture apparatus comprising an image sensor and the encoding apparatus of any one of clauses 1 to 13 and/or the decoding apparatus of any one of clauses 14 to 26 and a display to which the decoded images are output.

The invention claimed is:

1. An apparatus comprising:
an image data encoder configured to encode a current image region of an image, the image data encoder being operable in at least two modes of operation;
prediction circuitry configured to predict, from one or more properties of one or more image regions other than the current image region, whether the encoded data for the current image region will meet a predetermined criterion that specifies that data output by data transform circuitry for the current image region comprises at least a predetermined number of non-zero data values;
a controller configured to control, based upon the prediction of the encoded data for the current image region meeting the predetermined criterion, a mode of operation of the image data encoder, the mode of operation corresponding to one of the at least two modes of operation; and the data transform circuitry configured to apply one or more data transforms to data representing the current image region.

2. The apparatus according to claim 1, wherein the one or more data transforms comprise one or more of:
a primary transform;
a primary transform and a secondary transform;
an enhanced multiple transform; and
an adaptive multiple transform.

3. The apparatus according to claim 1, wherein the data transform circuitry is configured to selectively operate in a transform-skip mode in which a transform is not applied.

4. The apparatus according to claim 1, comprising:
an intra-image predictor configured to predict a current sample of a current image region, of a plurality of regions of an image, with respect to one or more corresponding reference samples of the same image according to a prediction direction between the current sample and a reference position amongst the reference samples;
a selector configured to select a filter of a set of two or more filters in response to the predetermined criterion; and
a reference sample filter configured to selectively apply the selected filter to at least some of the reference samples corresponding to the current region.

5. The apparatus according to claim 1, comprising indicator circuitry configured to selectively modify encoded data generated by the apparatus in respect of the current image region so as to indicate operation of the image data encoder in a first mode of the at least two modes of operation, subject to the encoded data for the current image region meeting the predetermined criterion, the image data encoder being configured not to operate in the first mode of operation when the encoded data does not meet the predetermined criterion.

6. The apparatus according to claim 1, wherein the one or more properties of one or more image regions other than the current image region comprise a region size of the one or more image regions.

7. The apparatus according to claim 6, wherein the one or more properties of one or more image regions other than the current image region comprise a difference in region size of the one or more image regions with the region size of the current image region.

8. The apparatus according to claim 1, wherein the one or more properties of one or more image regions other than the current image region comprise a number of non-zero data values generated in respect of the one or more other image regions.

9. The apparatus according to claim 1, wherein the current image region is a sub-region of a larger image region in a hierarchy of image regions; and
the one or more properties of one or more image regions other than the current image region comprise one or more properties of one or more larger image regions, higher within the hierarchy of image regions.

10. The apparatus according to claim 1, wherein the one or more properties of one or more image regions other than the current image region comprise one or more arithmetic coding contexts applicable to the one or more regions.

11. The apparatus according to claim 1, wherein the one or more image regions other than the current image region comprise one or more image regions neighbouring the current image region.

12. The apparatus according to claim 1, wherein the one or more image regions other than the current image region comprise one or more image regions encoded before the current image region.

13. An apparatus comprising:
  an image data decoder configured to decode a current image region of an image, the image data decoder being operable in at least two modes of operation;
  prediction circuitry configured to predict, from one or more properties of one or more image regions other than the current image region, whether the encoded data for the current image region will meet a predetermined criterion that specifies that data output by data transform circuitry for the current image region comprises at least a predetermined number of non-zero data values;
  a controller configured to control, based upon the prediction of the encoded data for the current image region meeting the predetermined criterion, a mode of operation of the image data decoder, the mode of operation corresponding to one of the at least two modes of operation; and
  the data transform circuitry configured to apply one or more data transforms to data representing the current image region.

14. The apparatus according to claim 13, wherein the data transform circuitry is configured to selectively operate in a transform-skip mode in which a transform is not applied.

15. A method comprising:
  encoding a current image region of an image, according to one of at least two modes of operation;
  predicting, from one or more properties of one or more image regions other than the current image region by circuitry, whether the encoded data for the current image region will meet a predetermined criterion that specifies that data output by applying one or more data transforms for the current image region comprises at least a predetermined number of non-zero data values;
  controlling, based upon the prediction of the encoded data for the current image region meeting the predetermined criterion, a mode of operation for encoding the current image region, the mode of operation corresponding to the one of the at least two modes of operation; and
  applying the one or more data transforms to data representing the current image region.

16. A non-transitory computer readable storage medium having instructions stored therein, which when executed by a processor causes the processor to executed a method according to claim 15.

17. A method comprising:
  decoding a current image region of an image, according to one of at least two modes of operation;
  predicting, from one or more properties of one or more image regions other than the current image region by circuitry, whether the encoded data for the current image region will meet a predetermined criterion that specifies that data output by applying one or more data transforms for the current image region comprises at least a predetermined number of non-zero data values;
  controlling, based upon the prediction of the encoded data for the current image region meeting the predetermined criterion, a mode of operation corresponding to the one of the at least two modes of operation; and
  applying the one or more data transforms to data representing the current image region.

18. A video storage, capture, transmission or reception apparatus comprising the apparatus according to claim 13.

* * * * *